(12) United States Patent
Takizawa et al.

(10) Patent No.: US 7,549,805 B2
(45) Date of Patent: Jun. 23, 2009

(54) TRANSCEIVER MODULE

(75) Inventors: Shigeyuki Takizawa, Shinagawa (JP);
Osamu Daikuhara, Shinagawa (JP);
Takeshi Ito, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 11/635,545

(22) Filed: Dec. 8, 2006

(65) Prior Publication Data
US 2007/0086710 A1  Apr. 19, 2007

Related U.S. Application Data

(63) Continuation of application No. PCT/JP2004/008335, filed on Jun. 15, 2004.

(51) Int. Cl.
G02B 6/36 (2006.01)
H04B 10/00 (2006.01)
H01R 12/00 (2006.01)

(52) U.S. Cl. .............................. 385/92; 439/67; 398/164
(58) Field of Classification Search ....................... None
See application file for complete search history.

(56) References Cited

U.S. PATENT DOCUMENTS

| 6,275,550 | B1 | 8/2001 | Fukuda |
| 7,275,937 | B2 * | 10/2007 | Ellison .......................... 439/67 |
| 2005/0245103 | A1 * | 11/2005 | Ellison .......................... 439/61 |
| 2005/0286906 | A1 * | 12/2005 | Togami et al. ............... 398/164 |

FOREIGN PATENT DOCUMENTS

| JP | 62-99014 | 6/1987 |
| JP | 64-13683 | 1/1989 |
| JP | 4-177796 | 6/1992 |
| JP | 5-59558 | 8/1993 |
| JP | 6-75874 | 3/1994 |
| JP | 8-129632 | 5/1996 |
| JP | 10-11550 | 1/1998 |
| JP | 10-126394 | 5/1998 |
| JP | 10-145402 | 5/1998 |
| JP | 10-215148 | 8/1998 |
| JP | 11-55231 | 2/1999 |
| JP | 11-275168 | 10/1999 |

(Continued)

OTHER PUBLICATIONS

International Search Report of the International Application PCT/JP2004/008335 (mailed on Oct. 5, 2004).

(Continued)

*Primary Examiner*—Tina M Wong
(74) *Attorney, Agent, or Firm*—Staas & Halsey LLP

(57) ABSTRACT

The object is to provide a transceiver module that is capable of performing a high-rate communication, and satisfies the demand at a moderate cost in a case where short distance communication is enough for transmitting or receiving signals. The transceiver module has a Re-timer 11, a control portion 12, a reference clock generating portion 13, a power portion 14 and a CX4 interface 15. The Re-timer 11 is coupled to a transceiver portion (Tx/Rx) 21 through an XAUI (10 Gigabit Media Independent Interface) interface 22, and is coupled to other component that is coupled to one end of a cable 150 for balanced transmission through the CX4 (10GBASE-CX4) interface 15.

8 Claims, 23 Drawing Sheets

FOREIGN PATENT DOCUMENTS

| | | |
|---|---|---|
| JP | 2000-357565 | 12/2000 |
| JP | 2001-21777 | 1/2001 |
| JP | 2002-328269 | 11/2002 |

OTHER PUBLICATIONS

Jun Takasoh, et al. "A Development of 10G bit Ethernet Transceiver in SOI-CMOS", Proceedings of the 2004 General Conference Communication $2^{nd}$, Japan, The Institute of Electronics, Information and Communication Engineers, Mar. 8, 2004, p. 473.

LAN Switch LSI corresponding to [10GBASE-CX4] in which copper wires are utilized, A maximum transmission distance is 25 meters, NE Nikkei Electronics, Japan, Nikkei Business Publications, Inc., Apr. 9, 2004, p. 44.

Japanese Office Action issued on Oct. 23, 2007 in connection with the corresponding Japanese patent application.

* cited by examiner

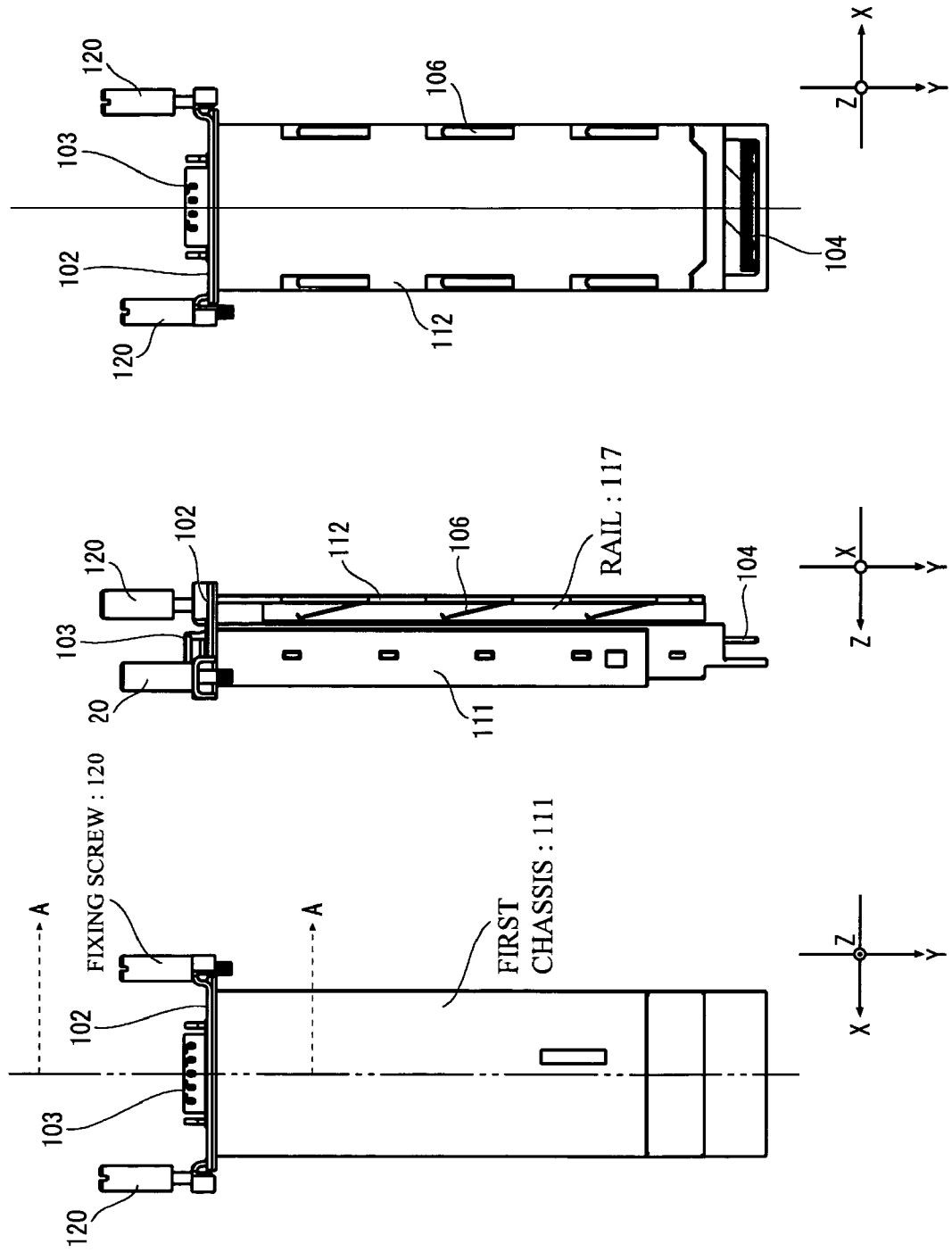

FIG. 10

USE EXAMPLE OF PINS OF XAUI INTERFACE

| PIN NO. | SIGNAL TYPE | PIN NO. | SIGNAL TYPE |
|---|---|---|---|
| 1 | GND | 70 | GND |
| 2 | GND | 69 | GND |
| 3 | GND | 68 | RESERVED |
| 4 | 5.0V | 67 | RESERVED |
| 5 | 3.3V | 66 | GND |
| 6 | 3.3V | 65 | TX LANE3− |
| 7 | APS(1.5V) | 64 | TX LANE3+ |
| 8 | APS(1.5V) | 63 | GND |
| 9 | LASI | 62 | TX LANE2− |
| 10 | RESET | 61 | TX LANE2+ |
| 11 | VEND SPECIFIC | 60 | GND |
| 12 | TX ON/OFF | 59 | TX LANE1− |
| 13 | RESERVED | 58 | TX LANE1+ |
| 14 | MOD DETECT | 57 | GND |
| 15 | VEND SPECIFIC | 56 | TX LANE0− |
| 16 | VEND SPECIFIC | 55 | TX LANE0+ |
| 17 | MDIO | 54 | GND |
| 18 | MDC | 53 | GND |
| 19 | PRTAD4 | 52 | GND |
| 20 | PRTAD3 | 51 | RX LANE3− |
| 21 | PRTAD2 | 50 | RX LANE3+ |
| 22 | PRTAD1 | 49 | GND |
| 23 | PRTAD0 | 48 | RX LANE2− |
| 24 | VEND SPECIFIC | 47 | RX LANE2+ |
| 25 | APS SET | 46 | GND |
| 26 | RESERVED | 45 | RX LANE1− |
| 27 | APS SENSE | 44 | RX LANE1+ |
| 28 | APS(1.5V) | 43 | GND |
| 29 | APS(1.5V) | 42 | RX LANE0− |
| 30 | 3.3V | 41 | RX LANE0+ |
| 31 | 3.3V | 40 | GND |
| 32 | 5.0V | 39 | RESERVED |
| 33 | GND | 38 | RESERVED |
| 34 | GND | 37 | GND |
| 35 | GND | 36 | GND |

FOR POWER UNIT / CONTROL PORTION

FOR DATA

FIG. 11

USE EXAMPLE OF PINS OF CX4 INTERFACE

| PIN NO. | PIN NO. | SIGNAL TYPE |
|---|---|---|
| 1 | | : GND |
| S1+ | S1− | : TX LANE3 (+, −) |
| 2 | | : GND |
| S2+ | S2− | : TX LANE2 (+, −) |
| 3 | | : GND |
| S3+ | S3− | : TX LANE1 (+, −) |
| 4 | | : GND |
| S4+ | S4− | : TX LANE0 (+, −) |
| 5 | | : GND |
| S5+ | S5− | : RX LANE3 (+, −) |
| 6 | | : GND |
| S6+ | S6− | : RX LANE2 (+, −) |
| 7 | | : GND |
| S7+ | S7− | : RX LANE1 (+, −) |
| 8 | | : GND |
| S8+ | S8− | : RX LANE0 (+, −) |
| 9 | | : GND |

CONNECTOR FOR BALANCED
TRANSMISSION FOR OPTICAL CABLE: 500

CONNECTOR FOR BALANCED
TRANSMISSION FOR OPTICAL CABLE: 500

FIXING PORTION: 602

TRANSCEIVER MODULE

CROSS REFERENCE TO RELATED APPLICATIONS

This application is a continuing application, filed under 35 U.S.C. §111(a), of International Application PCT/2004/008335, filed Jun. 15, 2004, the contents of which are incorporated herein.

TECHNICAL FIELD

This invention generally relates to a transceiver module, and in particular, relates to a transceiver module that is compliant with an Ethernet (registered trademark) having a max transfer rate at 10 Gbps.

BACKGROUND ART

Recently, there is a demand for further improvement of a transmission rate and a further extension of transmission distance because of a development of information society. A signal transferred on a network is changing from electricity to light.

There is an optical transceiver module disclosed in Japanese Patent Application Publication No. 2002-328269, as a communication device that uses an optical signal, has large capacity, and performs high-speed communication. FIG. 1 illustrates a structure of an optical transceiver module 900 based on the prior art.

As shown in FIG. 1, the optical transceiver module 900 has a housing 901, a bezel 902, two optical connectors 903, a PCB (Printed Circuit Board) connector 904 and a rail 905. The optical transceiver module 900 is attached to an information-processing device (hereinafter referred to a host device) such as a sever device, a network communication device (a switch, a router or the like) with the rail 905.

The PCB connector 904 is what is called a card edge type of connector, and is coupled directly to a motherboard (a system board) of an information-processing device. The PCB connector 904 is configured so as to be compliant with a generic XAUI (10 Gigabit Attachment Unit Interface). That is, the optical transceiver module 900 is coupled to the information-processing device through the XAUI in the prior art.

In the housing 901, there are provided a transmitter and a receiver not in shown in FIG. 1. Data fed from the information-processing device are, therefore, converted into optical signals in the transmitter and are transferred to an optical cable (not in shown in FIG. 1) coupled to the optical connector 903. In addition, the optical signals fed from the optical cable are converted into electrical signals in the receiver and are fed into the information-processing device through the PCB connector 904.

However, there is a problem that a communication device for transmitting or receiving optical signals such as the transmitter and the receiver mentioned above is expensive and lacks in generality compared to a communication device for transmitting or receiving electrical signals.

On the other hand, a specification, in particular a transmission distance, achieved in an optical communication is not always necessary and there is a case where an electrical communication solves the problem, if an information-processing device such as a server device is provided in a central area of a building when a system such as a LAN (Local Area Network) or a WAN (Wide Area Network) is structured.

Various aspects of this invention have been made in view of the above-mentioned circumstances. The present invention provides a transceiver module that is capable of performing a high-rate communication, and satisfies the demand at a moderate cost in a case where short distance communication is enough for transmitting or receiving signals.

DISCLOSURE OF THE INVENTION

According to an aspect of the present invention, preferably, there is provided a transceiver module including a connector for balanced transmission, a card edge connector and a transceiver portion, as claimed in claim 1. An electrical cable for balanced transmission is attachable to and detachable from the connector. The card edge connector is attachable to and is detachable from a motherboard of an information-processing device. The transceiver portion transmits data to and receives data from other components coupled to the electrical cable and the information-processing device. If an electrical cable having eight pairs of terminals, that is to say, an electrical cable having eight pairs of pair lines for balanced transmission, is used, it is possible to use an inexpensive element and a communication media. This is because an element and a cable for electrical signals are inexpensive compared to those for optical signals. In addition, 10 Gigabit Ethernet (registered trademark) that allows a relatively high-speed communication is compliant with IEEE802.3z 10GBASE-CX4. According to the compliance, it is possible to use the electrical cable having eight pairs of pair lines for balanced transmission. It is therefore possible to achieve high-speed communication by adopting this compliance.

In the transceiver module as claimed in claim 1, the transceiver portion may be coupled to the information-processing device through a 10 Gigabit Attachment Unit Interface compliant with IEEE802.3ae and may be coupled to the other components through a CX4 interface compliant with IEEE802.3z 10GBASE-CX4, as claimed in claim 2. An interface coupling the transceiver module and the other components may be a CX4 interface compliant with IEEE802.3z 10GBASE-CX4. It is therefore possible to couple the transceiver module and the other components through a relatively high-speed communication tool. In addition, an interface coupling the transceiver module and the other components may be a XAUI (10 Gigabit Attachment Unit Interface) interface compliant with IEEE802.3ae. It is therefore possible to couple the transceiver module and the other components through a relatively high-speed communication tool. As mentioned above, it is possible to couple an information-processing device and the other components through a relatively high-speed communication tool, by using a relatively high-speed interface.

The transceiver module as claimed in claim 1 may further include a control portion that controls the transceiver portion, as claimed in claim 3. And the control portion may control the transceiver portion according to a control signal that is fed from the information-processing device through the card edge connector. That is, the transceiver portion in the transceiver module may be configured to be controllable from the host device side.

The transceiver module as claimed in claim 1 may further include a power portion that provides electrical power to at least the transceiver portion, as claimed in claim 4. And the power portion may provide the electrical power according to a power supply voltage applied from the information-processing device through the card edge connector. That is, electrical power may be provided to the transceiver module from the host device side.

The transceiver module as claimed in claim 1 may further include a reference clock generating portion that generates a reference clock, as claimed in claim 5. And the transceiver portion may detect a clock from a signal that is fed from the connector for balanced transmission. The transceiver portion may adjust an edge timing between a bit range that is fed from the information-processing device and the reference clock that is fed from the reference clock generating portion, may synchronize with the other components, and may transmit the data.

According to another aspect of the present invention, preferably, there is provided a transceiver module including a connector for balanced transmission, a card edge connector, a transceiver portion, a detecting portion and a power providing portion, as claimed in claim 6. The connector for balanced transmission is coupled electrically or optically to an electrical cable and an optical cable, the electrical cable having a signal terminal and ground terminals, the optical cable having a photoelectric conversion portion, a signal terminal and ground terminals and being for balanced transmission. The card edge connector is attachable to and is detachable from a motherboard of an information-processing device. The transceiver portion transmits data to and receives data from other components coupled to the electrical cable or the optical cable and the information-processing device. The detecting portion detects whether a cable coupled to the connector for balanced transmission is the electrical cable. The power providing portion provides an electrical power to the electrical cable if the cable is the electrical cable. The transceiver module can respond to both the optical cable and the electric cable by itself and can provide electrical power according to need, because the transceiver module can detect whether a cable coupled to the connector for balanced transmission is the electrical cable.

In the transceiver module as claimed in claim 6, the detecting portion may detect whether the cable is the electrical cable according to an electrical potential at the ground terminals, as claimed in claim 7.

In the transceiver module as claimed in claim 6, the power providing portion may provide an electrical power to the electrical cable through one of the ground terminals, as claimed in claim 8.

According to still another aspect of the present invention, preferably, there is provided a transceiver module including a connector, a card edge connector, a transceiver portion, a latch portion, a wedge portion and a lever for operation of the wedge portion. The connector for balanced transmission is coupled to an electrical cable electrically or is coupled to an optical cable optically. The card edge connector is attachable to or is detachable from a motherboard of an information-processing device. The transceiver portion transmits data to or receives data from other components coupled to the electrical cable or the optical cable and the information-processing device. The latch portion is projecting from a side face of a chassis of the transceiver module. The wedge portion houses the latch portion in the chassis. The lever is configured integrally with the wedge portion. The wedge portion pulls the latch portion into the chassis when the lever slides in a drawing direction of the transceiver module. It is therefore possible to prevent an unconsidered detachment of the transceiver module when attached. In addition, it is possible to achieve the prevention with a simple configuration.

The transceiver module as claimed in claim 9 may further include a spring that returns the lever to normal condition.

According to yet another aspect of the present invention, preferably, there is provided a transceiver module including a connector, a card edge connector, a transceiver portion, a first chassis, a second chassis, a convexed locking mechanism and a concaved locking mechanism. The connector is coupled to an electrical cable electrically or is coupled to an optical cable optically. The card edge connector is attachable to or is detachable from a motherboard of an information-processing device. The transceiver portion transmits data to or receives data from other components coupled to the electrical cable or the optical cable and the information-processing device. The first chassis and the second chassis form a housing of the transceiver module. The convexed locking mechanism is provided at the first chassis. The concaved locking mechanism is provided at the second chassis. The first chassis and the second chassis are formed through pressing process or molding process. It is possible to reduce weight of the transceiver module, is possible to improve a manufacturing accuracy or a productivity rate of the transceiver module, and is possible to provide the transceiver module at moderate cost, because at least a part of the chassis is formed through pressing process or molding process.

In the transceiver module as claimed in claim 11, the first chassis and the second chassis formed through pressing process or molding process may be processed through drawing process, and may be directly or indirectly in touch with a surface-mounted component housed in the housing, as claimed in claim 12. It is possible to emit heat generated in the surface-mounted component efficiently, because the chassis formed through pressing process or molding process is directly or indirectly in touch with the surface-mounted component.

In the transceiver module as claimed in claim 11, the first chassis and the second chassis formed through pressing process or molding process may have an air hole that exposes at least a part of a surface-mounted component housed in the housing, as claimed in claim 13. It is possible to emit heat generated in the surface-mounted component, because at least a part of the surface-mounted component is exposed.

According to yet another aspect of the present invention, preferably, there is provided a connector for balanced transmission including a socket, a photoelectric conversion portion, an external connection connector, first internal connection connector and a board. An optical cable is attachable to and detachable from the socket. The photoelectric conversion portion is provided on a bottom part of the socket. The external connection connector is to be coupled to an external device. The first internal connection connector is provided on an opposite face from the socket of the photoelectric conversion portion. The board has a card edge type of a first connector at one end thereon. The board and the photoelectric conversion portion are coupled electrically when the first connector is inserted in the first internal connection connector. It is possible to arrange the socket, the photoelectric conversion portion and the board linearly and is possible to reduce the thickness of the connector for balanced transmission.

In the connector for balanced transmission as claimed in claim 14, the external connection connector and the board may be coupled electrically through a right angle SMT type of a connector, as claimed in claim 15.

In the connector for balanced transmission as claimed in claim 14, the external connection connector and the board may be coupled electrically through a clipping SMT type of a connector, as claimed in claim 16.

In the connector for balanced transmission as claimed in claim 14, a given impedance of a signal line provided on the board may be 100 ohm against a differential signal, as claimed in claim 17.

The connector for balanced transmission as claimed in claim 14 may further include a chassis housing the photoelectric conversion portion and the board. And the chassis may be metallic. It is possible to improve the electrical characteristic.

The connector for balanced transmission as claimed in claim 14 may further include a fixing portion having a screw shape that secures the connector for balanced transmission to the external device. It is possible to prevent an unconsidered detachment of the connector for balanced transmission from an external device.

EFFECT OF THE INVENTION

In accordance with the invention, it is possible to provide a transceiver module that is capable of performing a high-rate communication, and satisfies the demand at a moderate cost in a case where short distance communication is enough for transmitting or receiving signals.

BRIEF DESCRIPTION OF THE DRAWINGS

Exemplary embodiments of one or more aspects of the invention will be described with reference to the following drawings, wherein:

FIG. 3A illustrates a top view of the transceiver module 100 (an exterior viewed toward the minus Z-direction), FIG. 3B illustrates a side view of the transceiver module 100 (an exterior viewed toward the X-direction), and FIG. 3C illustrates a bottom view of the transceiver module 100 (an exterior viewed toward the Z-direction);

FIG. 10 illustrates a use example of pins of an XAUI interface 22;

FIG. 11 illustrates a use example of a CX4 interface 15;

BEST MODE FOR CARRYING OUT THE INVENTION

A description will now be given, with reference to the accompanying drawings, of embodiments of the present invention.

FIRST EMBODIMENT

A detail description will be given of a transceiver module 100 in accordance with a first embodiment of the present invention, with reference to the following drawings. The first embodiment relates, in particular, to a transceiver module compliant with an Ethernet (registered trademark) having a max transfer rate at 10 Gbps. The transceiver module can be coupled to a cable 150 for balanced transmission mentioned later (referring to FIG. 5) and allows sending or receiving data between information-processing devices such as a server device, a network communication device (host device) or the like. However, this invention is not limited to these mentioned above and is susceptible of modification, variation and change without departing from the proper and fair meaning.

Figure 1:
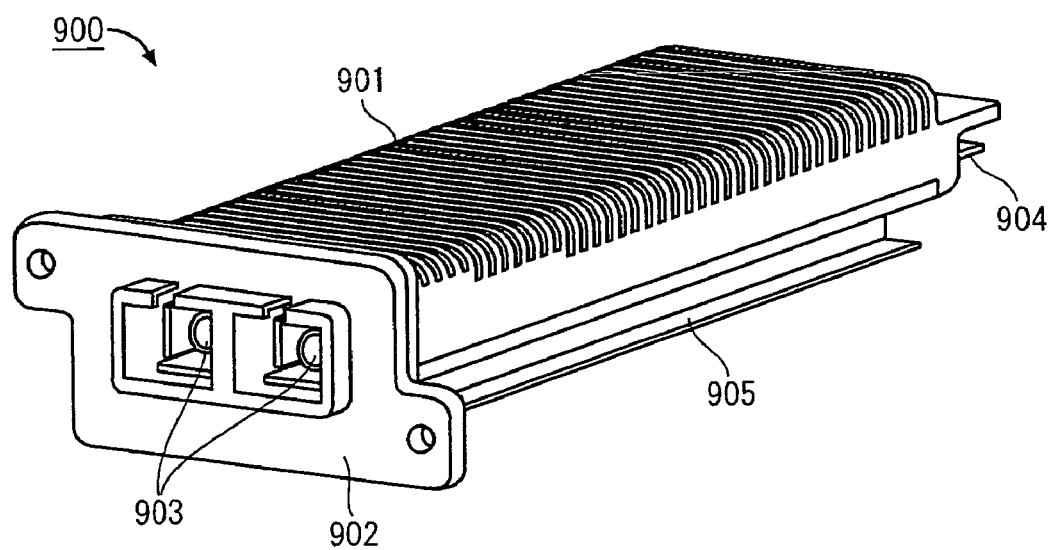
FIG. 1 illustrates a perspective view of an optical transceiver module 900 based on the prior art.
Figure 2:
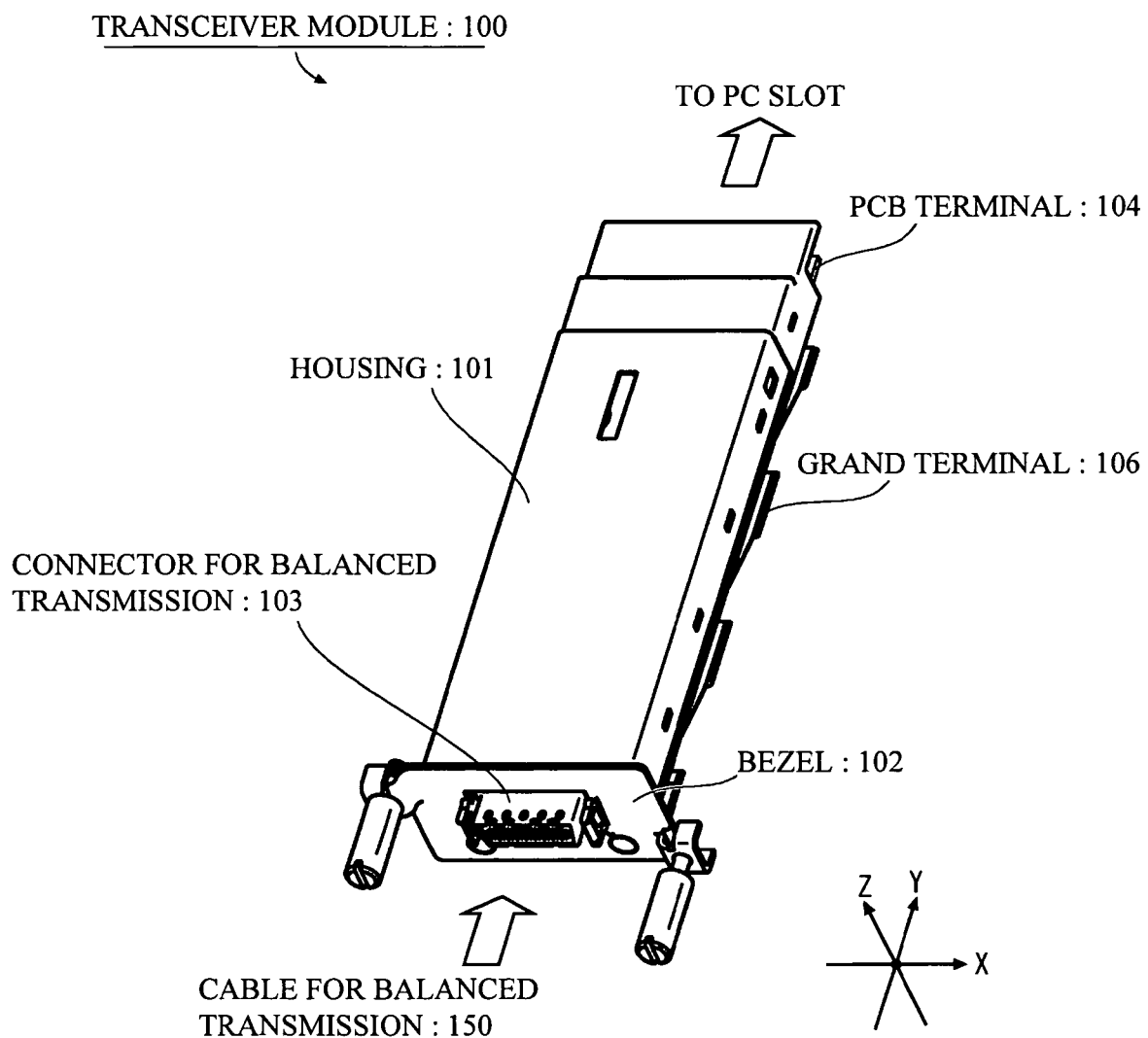
FIG. 2 illustrates a perspective view of a schematic exterior of a transceiver module 100 in accordance with a first embodiment of the invention.

FIG. 2 illustrates a perspective view of a schematic exterior of the transceiver module 100 in accordance with the first embodiment. As shown in FIG. 2, the transceiver module 100 has a housing 101, a bezel 102, a connector 103 for balanced transmission, a PCB terminal 104 and a ground terminal 106.

The housing 101 houses a printed circuit board (hereinafter referred to PCB) having an internal circuit mentioned later and so on thereon. A PCB 113 (referring to FIG. 6) and the internal circuit will be described with reference to FIG. 9.

The bezel 102 is an outer chassis provided on one side face of the housing 101, in particular a face of the housing 101 exposed outside of an information-processing device body when the transceiver module 100 is implemented on the information-processing device. The bezel 102 is also referred to a front bezel. Hereinafter, the information-processing device is referred to a host device. A direction of insertion of the transceiver module 100 is referred to a Y-direction. A direction vertical to the Y-direction and in parallel with a plane of the PCB 113 is referred to an X-direction. A direction vertical to the X-direction and the Y-direction is referred to a Z-direction.

The connector 103 for balanced transmission to be coupled to the cable 150 for balanced transmission (referring to FIG. 5) is provided at the central part of the bezel 102. That is to say, the connector 103 for balanced transmission has a structure where the cable 150 for balanced transmission is attachable and is detachable. The connector 103 for balanced transmission may be compliant with an interface standard for IEEE802.3z 10Gbase-CX4 or the like. The shape of the connector 103 will be given in detail later.

A part of the PCB 113 having the internal circuit thereon is projecting from the housing 101. The projecting part has the PCB terminal 104 that couples the transceiver module 100 and the host device electrically. The PCB terminal 104 is what is called a card edge connector, and is attachable to and is detachable from a connector provided in a motherboard of the host device. That is, the connector provided in the motherboard is coupled electrically to the PCB terminal 104 of the transceiver module 100, when the transceiver module 100 is attached to a fixed slot of the host device. The PCB terminal 104 may be compliant with IEEE802.3ae XAUI (10 Gigabit Attachment Unit Interface).

The ground terminal 106 is coupled electrically to a ground line provided in the host device when the transceiver module 100 is attached to the host device, as well as the PCB terminal 104. It is thus possible to earth the housing 101 and other members.

Figure 4A:
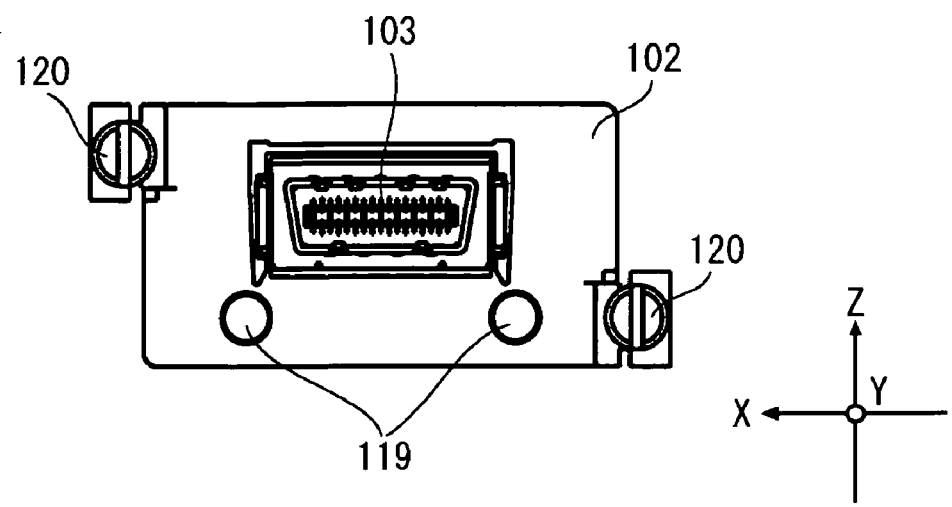
FIG. 4A illustrates a front view of the transceiver module 100 (an exterior viewed toward the Y-direction)
Figure 4B:
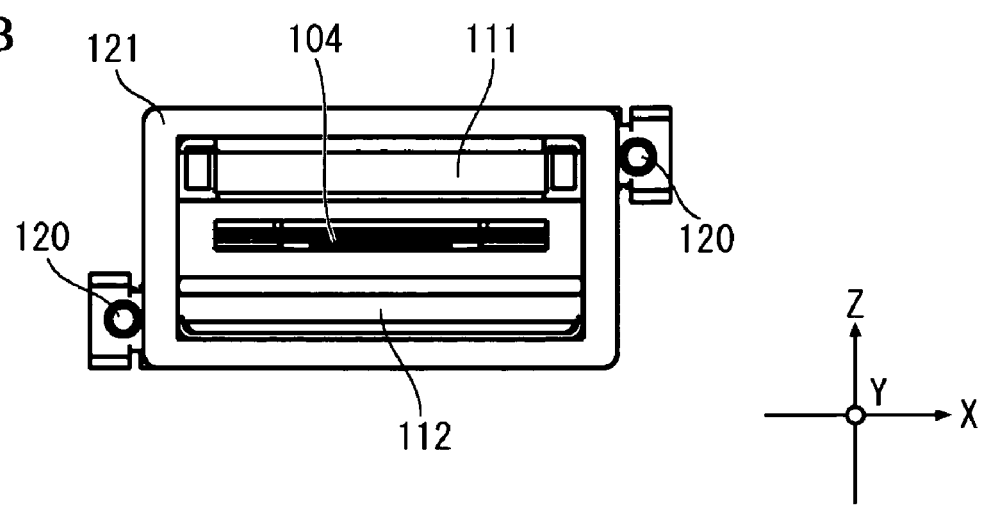
FIG. 4B illustrates a back view of the transceiver module 100 (an exterior viewed toward the minus Y-direction) and FIG. 4C illustrates a cross sectional view taken along a line A-A shown in FIG. 3A.
Figure 4C:
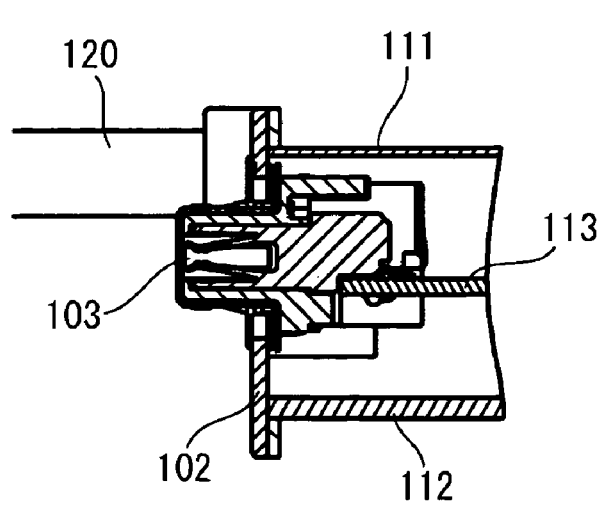

Next, a description will be given in detail of the outer structure of the transceiver module 100 with reference to the following drawings. FIG. 3A illustrates a top view of the transceiver module 100 (an exterior viewed toward the minus Z-direction). FIG. 3B illustrates a side view of the transceiver module 100 (an exterior viewed toward the X-direction). FIG. 3C illustrates a bottom view of the transceiver module 100 (an exterior viewed toward the Z-direction). FIG. 4A illustrates a front view of the transceiver module 100 (an exterior viewed toward the Y-direction). FIG. 4B illustrates a back view of the transceiver module 100 (an exterior viewed toward the minus Y-direction). FIG. 4C illustrates a cross sectional view taken along a line A-A shown in FIG. 3A.

As shown in FIG. 3A through FIG. 3C and FIG. 4A through FIG. 4C, the transceiver module 100 has a first chassis 111, a second chassis 112, the PCB 113, the bezel 102, the connector 103 for balanced transmission, the PCB terminal 104, the ground terminal 106, a rail 117, an assembling screw 119 and a fixing screw 120.

The first chassis 111 and the second chassis 112 form the housing 101. The PCB 113 is housed in the first chassis 111 and the second chassis 112 assembled together. The PCB 113 is a board having the internal circuit thereon, mentioned above.

In the second chassis 112, the rail 117 is provided in parallel with the insertion direction into the host device of the transceiver module 100. On the other hand, in the slot where the transceiver module 100 is to be inserted, there is provided a rail groove to be engaged with the rail 117. Therefore, when the transceiver module 100 is inserted into the host device, the rail 117 slides along the rail groove and the transceiver module 100 is guided to a regular position. And the PCB terminal 104 is inserted in a connector provided on a bottom of the slot in the host device.

The fixing screw 120 is a screw for fixing the transceiver module 100 when the transceiver module 100 is attached to the host device. That is, there is provided a screw hole at a given position of the host device. The transceiver module 100 is fixed to the host device, when the transceiver module 100 is inserted in the fixed slot and the fixing screw 120 is installed in the screw hole.

In addition, a description of the bezel 102, the connector 103 for balanced transmission, the PCB terminal 104 and the ground terminal 106 is omitted because the description was given above. A description will be given later of the assembling screw 119 with reference to FIG. 6.

Figure 5:
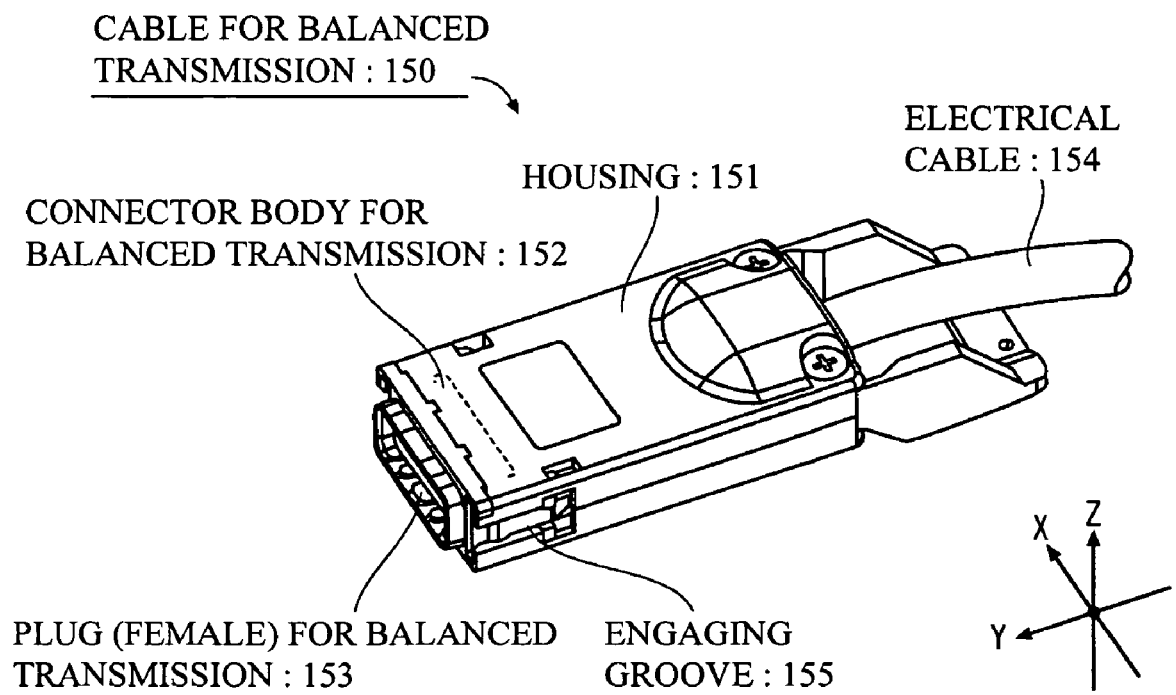
FIG. 5 illustrates a structure of a cable 150 for balanced transmission to be coupled to a connector 103 for balanced transmission in accordance with the first embodiment.

Next, a description will be given of a structure of the cable 150 for balanced transmission to be coupled to the connector 103 for balanced transmission, with reference to FIG. 5. As shown in FIG. 5, the cable 150 for balanced transmission has a housing 151, a connector body 152 for balanced transmission, a plug (female) 153 for balanced transmission, an electrical cable 154 and an engaging groove 155. A description will be given later of the engaging groove 155.

The connector body 152 for balanced transmission is implemented in a forward end side (side of the transceiver module 100) of the housing 151. The plug (female) 153 for balanced transmission is projecting at the forward end of the housing 151. The electrical cable 154 extends from a back end of the housing 151.

The plug (female) 153 for balanced transmission is a connector unit to be engaged with the connector 103 for balanced transmission mentioned above (in particular, a plug (male) 130 for balanced transmission). Therefore, the plug (female) 153 for balanced transmission may be compliant with an interface standard for IEEE 802.3z 10GBASE-CX4 or the like.

Next, a description will be given in detail of another structure of the transceiver module 100 with reference to an exploded view illustrated in FIG. 6.

Figure 6:
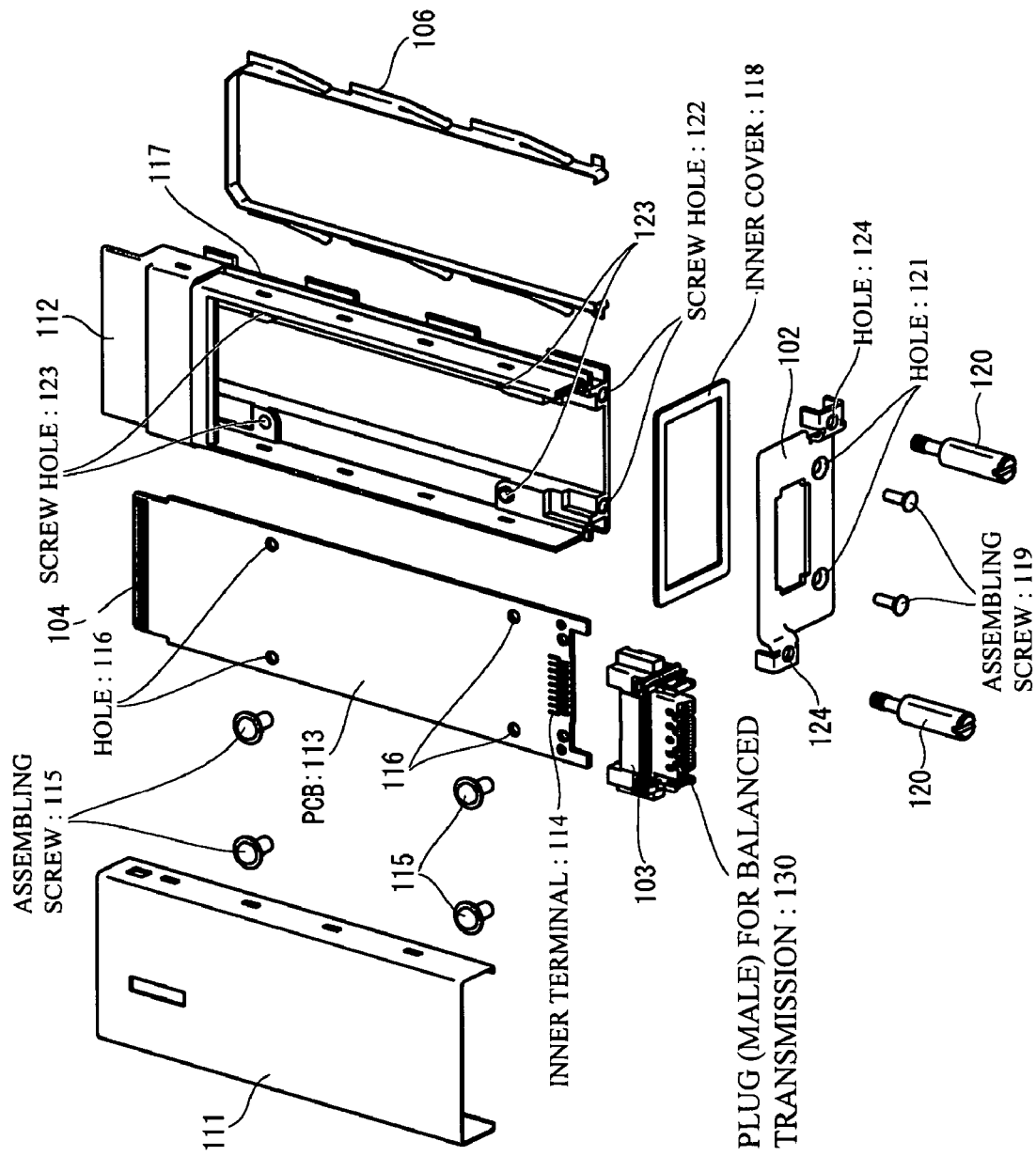
FIG. 6 illustrates an exploded view of the transceiver module 100 in accordance with the first embodiment.

As shown in FIG. 6, the transceiver module 100 has the first chassis 111, the second chassis 112, the PCB 113, the connector 103 for balanced transmission, the bezel 102 and an inner cover 118.

The PCB 113 having the internal circuit thereon has holes 116. In addition, the second chassis 112 has screw holes 123. The PCB 113 is secured to a given position of the second chassis 112 with assembling screws 115. The PCB 113 is housed in the housing 101, when the opening side of the second chassis 112 is sealed with the first chassis 111 after the PCB 113 is secured.

As mentioned above, the PCB terminal 104 is provided at one end part of the PCB 113, an end part to be inserted in a PC. In contrast, there is provided an internal terminal 114 to be coupled to a metal pattern of the connector 103 for balanced transmission at the other end part, an end part where the connector 103 for balanced transmission is provided, of the PCB 113.

The connector 103 for balanced transmission is a unit having the plug (male) 130 for balanced transmission to be engaged with the plug (female) 153 for balanced transmission. Therefore, the plug (male) 130 for balanced transmission is coupled electrically to the metal pattern formed on the plug (female) 153 for balanced transmission, when the plug (male) 130 for balanced transmission is inserted in the plug (female) 153 for balanced transmission.

After the first chassis 111, the second chassis 112, the PCB 113 and the connector 103 for balanced transmission are assembled together, the side of the connector 103 for balanced transmission is sealed with the bezel 102. The bezel 102 has holes 121. In addition, the second chassis 112 has screw holes 122. The bezel 102 is secured to a given position of the second chassis 112 with the assembling screws 119. In this case, it is possible to prevent an ingression of dust and to increase strength of the transceiver module 100, if the inner cover 118 is provided between the bezel 102 and the second chassis 112.

As mentioned above, the ground terminal 106 is provided at the rail 117 for guiding the transceiver module 100 to the regular position. On the other hand, the rail groove of the host device mentioned above serves as a ground line. Components coupled to the ground terminal 106 are thus earthed if implemented.

Further, the bezel 102 has at least two holes 124, as mentioned above. On the other hand, there are provided screw holes at positions corresponding to the holes 124 in the host device. It is thus possible to secure the transceiver module 100 to the host device when the fixing screws 120 are inserted in the holes 124 and the fixing screws 120 are installed in the screw holes in the host device.

Figure 7A:
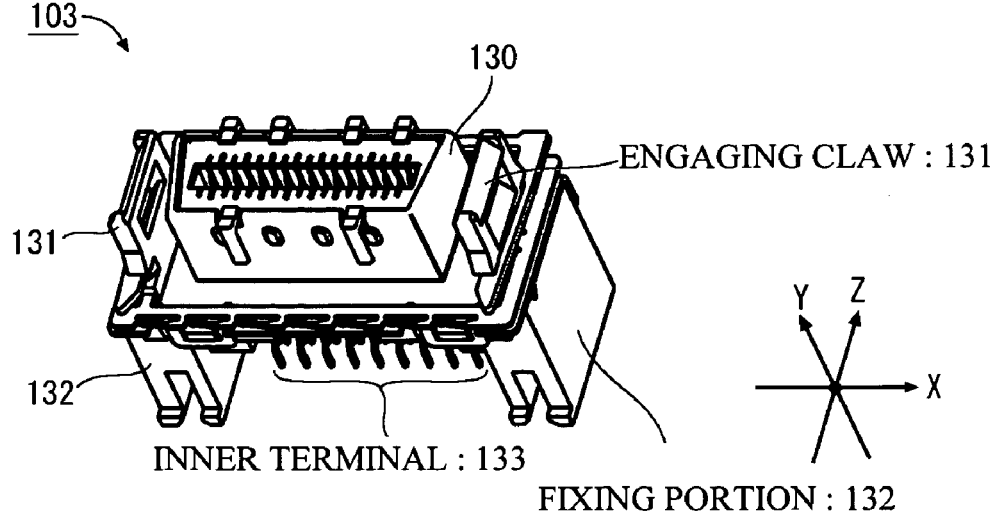
FIG. 7A illustrates a perspective view of the connector 103 for balanced transmission.
Figure 7B:
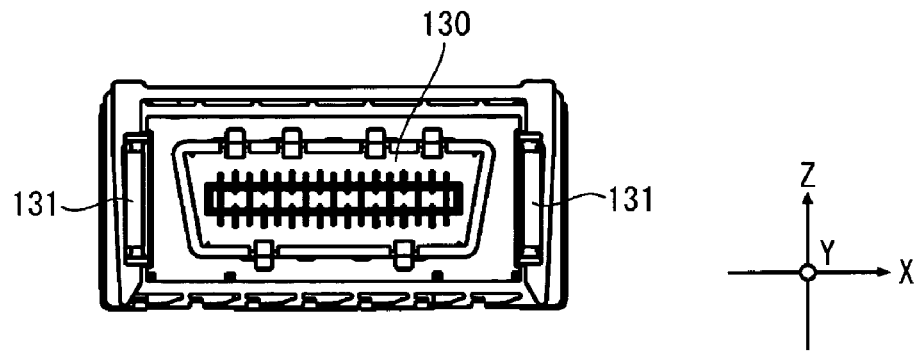
FIG. 7B illustrates a front view of the connector 103 for balanced transmission (an exterior viewed toward the minus Z-direction)
Figure 7C:
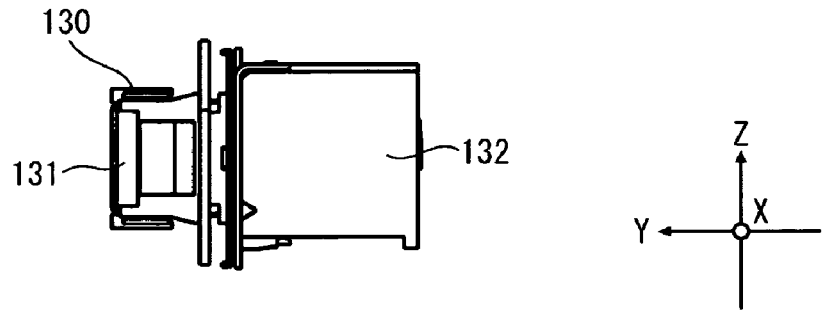
FIG. 7C illustrates a side view of the connector 103 for balanced transmission (an exterior viewed toward the X-direction)
Figure 7D:
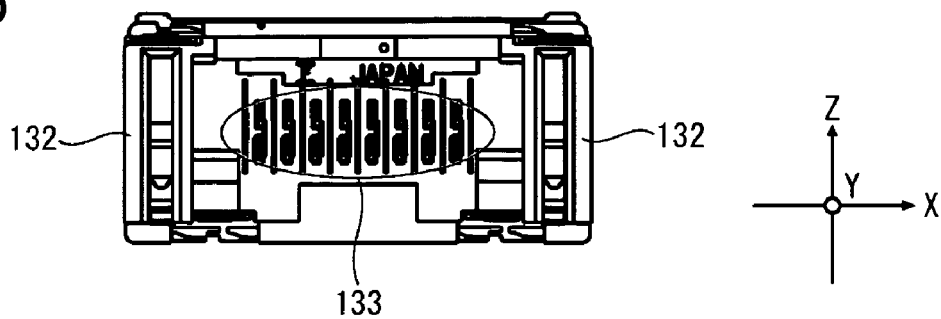
FIG. 7D illustrates a back view of the connector 103 for balanced transmission (an exterior viewed toward the Z-direction)
Figure 8A:
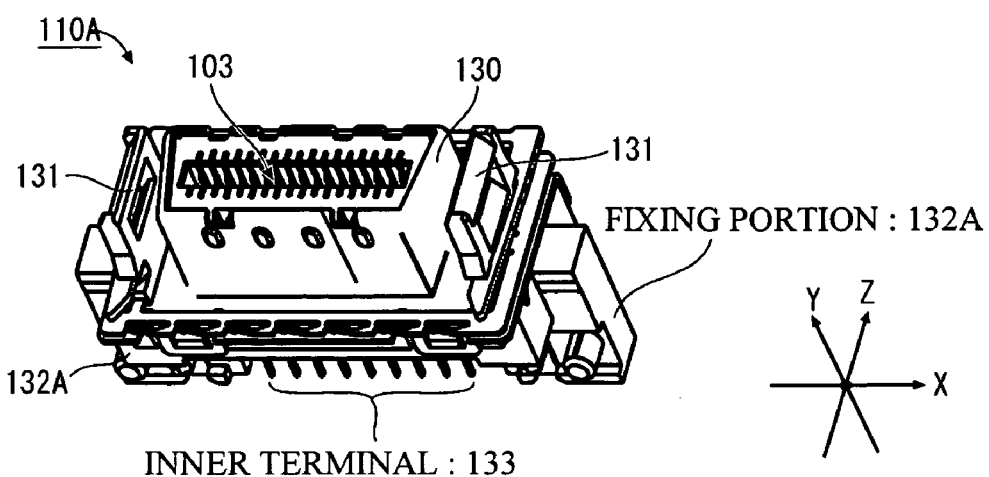
FIG. 8A illustrates a perspective view of the connector 103 for balanced transmission.
Figure 8B:
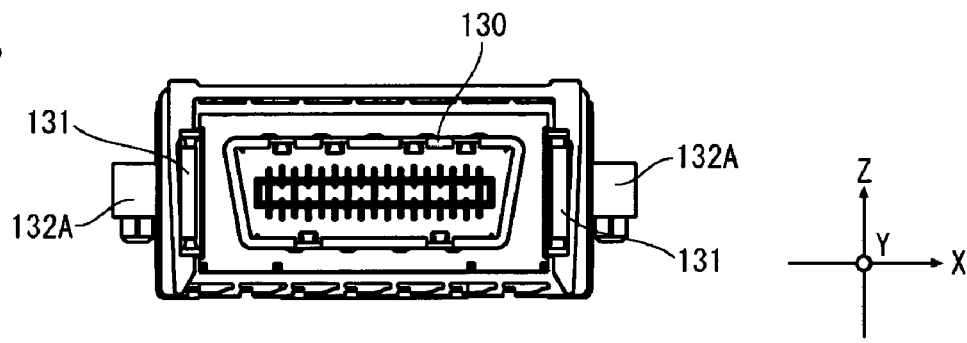
FIG. 8B illustrates a front view of the connector 103 for balanced transmission (an exterior viewed toward the minus Z-direction)
Figure 8C:
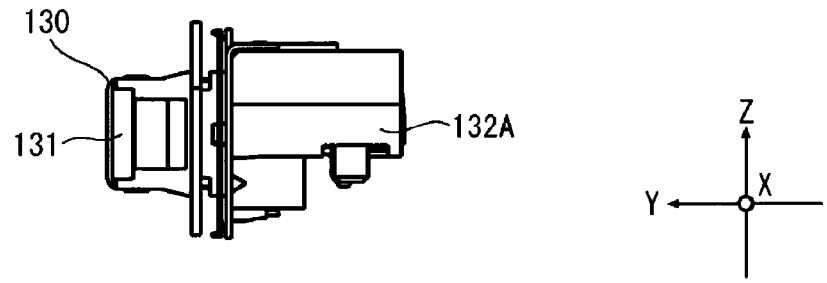
FIG. 8C illustrates a side view of the connector 103 for balanced transmission (an exterior viewed toward the X-direction)
Figure 8D:
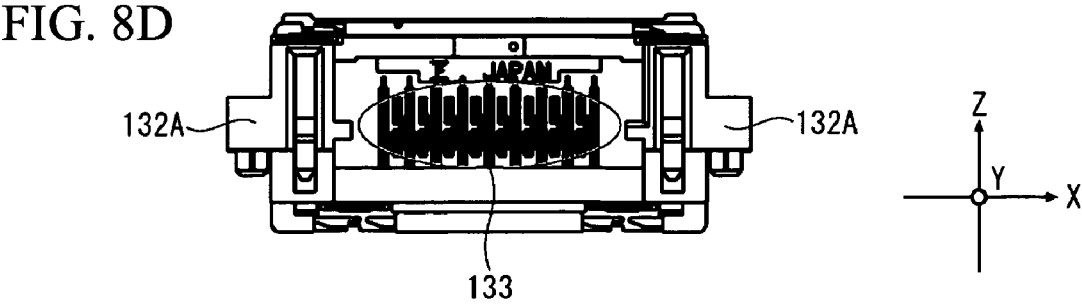
FIG. 8D illustrates a back view of the connector 103 for balanced transmission (an exterior viewed toward the Z-direction)

Next, a description will be given of a structure of the connector 103 for balanced transmission in accordance with the first embodiment, with reference to FIG. 7A through FIG. 7D. FIG. 7A illustrates a perspective view of the connector 103 for balanced transmission. FIG. 7B illustrates a front view of the connector 103 for balanced transmission (an exterior viewed toward the minus Z-direction). FIG. 7C illustrates a side view of the connector 103 for balanced transmission (an exterior viewed toward the X-direction). FIG. 7D illustrates a back view of the connector 103 for balanced transmission (an exterior viewed toward the Z-direction).

As shown in FIG. 7A through FIG. 7D, the connector 103 for balanced transmission has the plug (male) 130 for balanced transmission, an engaging claw 131, a fixing portion 132 and an internal terminal 133.

As mentioned above, the plug (male) 130 for balanced transmission is a unit to be coupled to the plug (female) 153 for balanced transmission of the cable 150 for balanced transmission and to form an electrical connection. When the engaging claw 131 is engaged with the engaging groove 155 of the cable 150 for balanced transmission, the cable 150 for balanced transmission is secured to the transceiver module 100. The fixing portion 132 determines the position of the connector 103 for balanced transmission with respect to the housing 101 formed of the first chassis 111 and the second chassis 112, and secures the connector 103 for balanced transmission. The internal terminal 133 forms an electrical connection, when the internal terminal 133 contacts to the internal terminal 114 of the PCB 113.

FIG. 8A through FIG. 8D illustrate another structure of the connector 103 for balanced transmission. The structure shown in FIG. 8A through FIG. 8D is nearly the same as that shown in FIG. 7A through FIG. 7D. The shape of a fixing portion 132A is different from the fixing portion 132 shown in FIG. 7A through FIG. 7D. It is thus possible to change the connector 103 for balanced transmission diversely.

Next, a description will be given of a circuit configuration of the transceiver, that is to say, a configuration of the internal circuit mounted on the PCB 113, with reference to following drawings.

Figure 9:
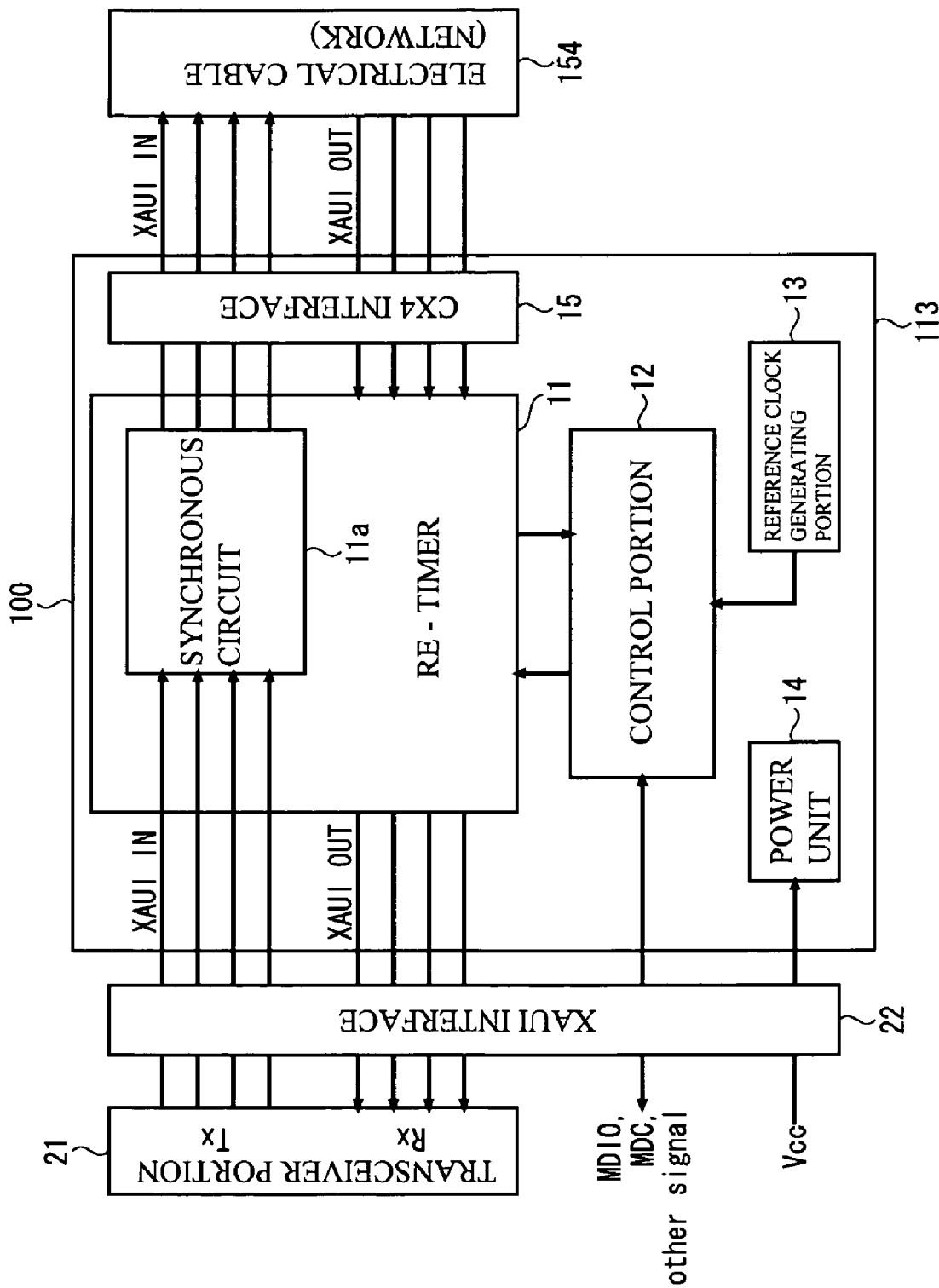
FIG. 9 illustrates a block diagram showing the circuit configuration of the transceiver module 100 in accordance with the first embodiment.

FIG. 9 illustrates a block diagram showing the circuit configuration of the transceiver module 100. As shown in FIG. 9, the transceiver module 100 has a Re-timer 11, a control portion 12, a reference clock generating portion 13, a power unit 14 and a CX4 interface 15. The transceiver module 100 is coupled to a transceiver portion (Tx/Rx) 21 in the host device through an XAUI interface (10 Gigabit Attachment Unit Interface) 22, and is coupled to other components coupled to one end of the cable 150 for balanced transmission through the CX4 interface 15. In addition, the internal circuit formed on the PCB 113 mentioned above is formed of the Re-timer 11, the control portion 12, the reference clock generating portion 13, the power unit 14 and the CX4 interface 15.

The transceiver portion (Tx/Rx) 21 provided at the host device side is a device achieving XGXS (10 Gigabit Ethernet (registered trademark) Extended Sublayer) compliant with IEEE802.3ae. That is, the transceiver portion (Tx/Rx) 21 is one of applications developed for 10 Gigabit Ethernet (registered trademark) compliant with IEEE802.3ae, and serves as a connection between the XGMII (10 Gigabit Media Independent Interface) device and the XAUI device. The XGMII device is one of the applications compliant with IEEE802.3ae, and is an interconnect interface of DDR (Double Data Rate) at 156 MHz, is concurrent, has a small range, and supports the MAC (Media Access Control) of 10 Gigabit Ethernet (registered trademark) and an interface of PHY (Physical layer) device.

The Re-timer 11 detects a clock from a signal fed from the host device through the connector 103 for balanced transmission. The Re-timer 11 adjusts edge timing between a bit range of data input from the host device and a reference clock input from the reference clock generating portion 13, and synchronizes with a network formed by the electrical cable 154. The Re-timer 11 transmits data input from the transceiver portion (Tx/Rx) 21 provided at the host device side to another component coupled to the other end of the cable 150 for balanced transmission. In addition, the circuit synchronizing with the network is referred to a synchronous circuit (Normalization) 11a in the embodiment. The Re-timer 11 inputs the data fed from the network to the transceiver portion (Tx/Rx) 21 in the host device.

The Re-timer is coupled to the transceiver portion (Tx/Rx) 21 through the XAUI interface 22. The XAUI interface 22 is one of the applications compliant with IEEE802.3ae and is a high-speed interconnection providing a pin count reduction, as mentioned above. As a reference, FIG. 10 illustrates a use example of pins of the XAUI interface 22.

As shown in FIG. 10, the XAUI interface 22 has a connector shape having 70 pins. A first pin through a thirty-fifth pin are used for input terminals of control signals to control the power unit of the transceiver module 100 and other components such as the control portion 12. A thirty-sixth pin through a seventieth pin are used for inputting or outputting objective data. Data are input as eight pairs of differential signals, as is clear with reference to the pins for inputting or outputting data, that is to say, the thirtieth pin through the seventieth pin.

On the other hand, the Re-timer 11 is coupled to the network through the CX4 interface 15. That is, the connector 103 for balanced transmission and the cable 150 for balanced transmission are compliant with 10GBASE-CX4. FIG. 11 illustrates a use example of the CX4 interface 15, as a reference.

As shown in FIG. 11, the CX4 interface 15 has eight pairs of pins (S1+through S8+and S1−through S8−) for inputting or outputting objective data. There are provided nine pins (G1 through G9) respectively between the eight pairs of pins. The nine pins are mainly used for ground terminals. The S1 (+, −) pin through the S8 (+, −) pin are used for signal terminals and respectively corresponds to the sixty-fifth and the sixty-fourth pins, to the sixty-second and the sixty-first pins, to the fifty-ninth and the fifty-eighth pins, to the fifty-sixth and the fifty-fifth pins, to the fifty-first and the fiftieth pins, to the fortyeighth and the forty-seventh pins, to the forty-fifth and the forty-fourth pins, and the forty-second and the forty-first pins. That is, the cable 150 for balanced transmission transmits objective data as deferential signals through the eight pairs of cables.

Referring back to FIG. 9, the control portion 12 controls the Re-timer 11 according to control signals such as MIDO signals, MDC signals or the other signals that are fed from the host device. In addition, the reference clock generating portion 13 generates the reference clock used to be synchronized to the network, and inputs the clock reference to the control portion 12. The control portion 12 thus operates the Re-timer 11 according to the reference clock and controls the Re-timer 11 so as to transmit or receive data.

In addition, the power unit (Hot Swap Control) 14 applies a power supply voltage Vcc fed from the host device through the XAUI interface 22 into the transceiver module 100.

In accordance with the embodiment, it is possible to provide a transceiver module that is capable of performing a high-rate communication, and satisfies the demand at a moderate cost in a case where short distance communication is enough for transmitting or receiving signals.

SECOND EMBODIMENT

Next, a detail description will be given of a second embodiment with reference to following drawings. Hereinafter, the same components and configurations as those of the first embodiment have the same reference numerals and a detailed explanation will be omitted. In addition, unspecified configuration is same as in the first embodiment.

In the first embodiment, only electrical signals are intended. In contrast, both of electrical signals and light signals are intended in the second embodiment. In addition, the structure of a transceiver module 200 is as same as that of the transceiver module 100. A detail description is omitted. A detail description will be given of a circuit configuration that is characteristic part of the second embodiment.

Figure 12:
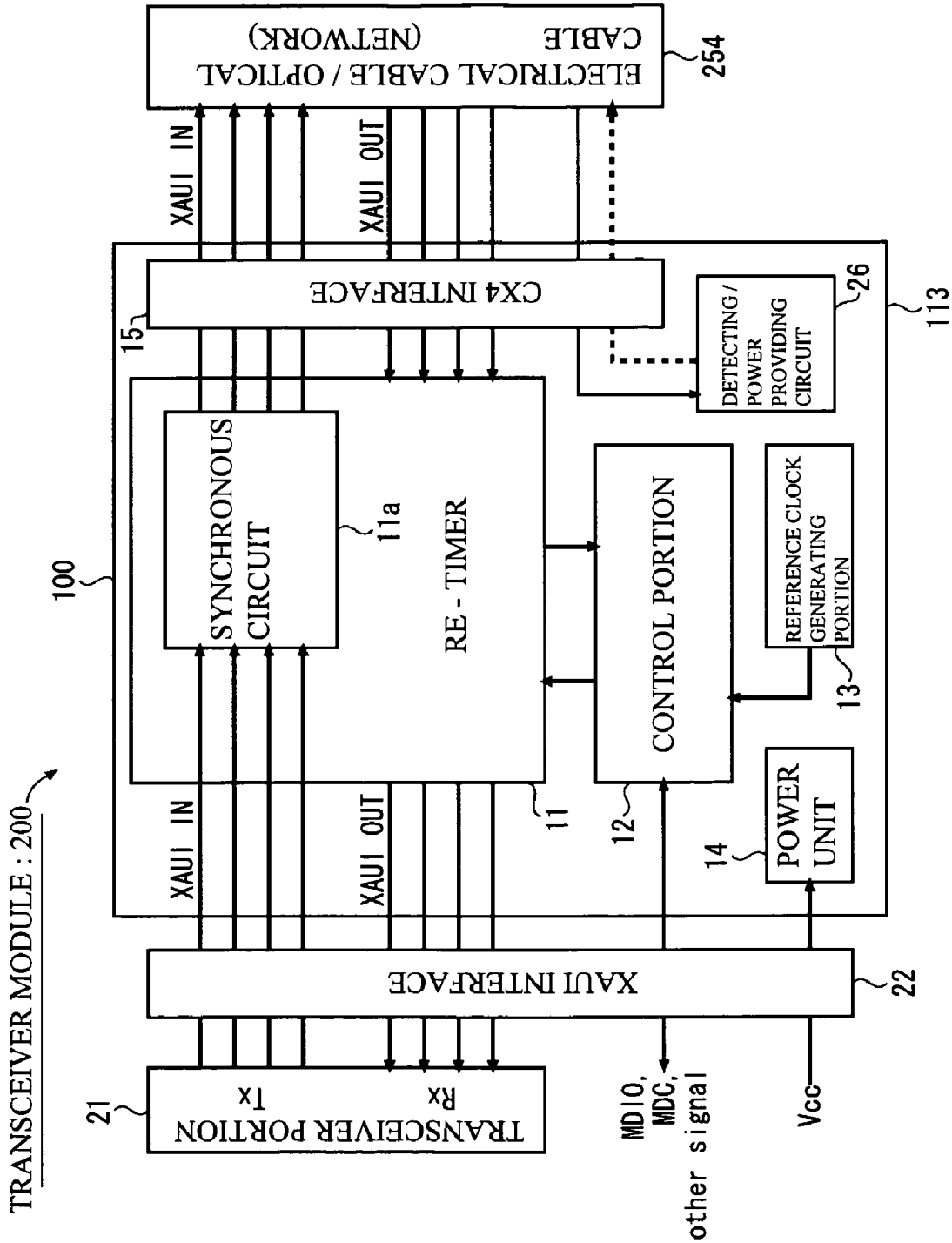
FIG. 12 illustrates a block diagram showing the circuit configuration of a transceiver module 200 in accordance with a second embodiment.

FIG. 12 illustrates a block diagram showing a circuit configuration of the transceiver module 200 in accordance with the second embodiment. As shown in FIG. 12, the transceiver module 200 in accordance with the embodiment has the same configuration as that of the transceiver module 100 shown in FIG. 9 in accordance with the first embodiment and a detecting/power providing circuit 26.

Figure 13:
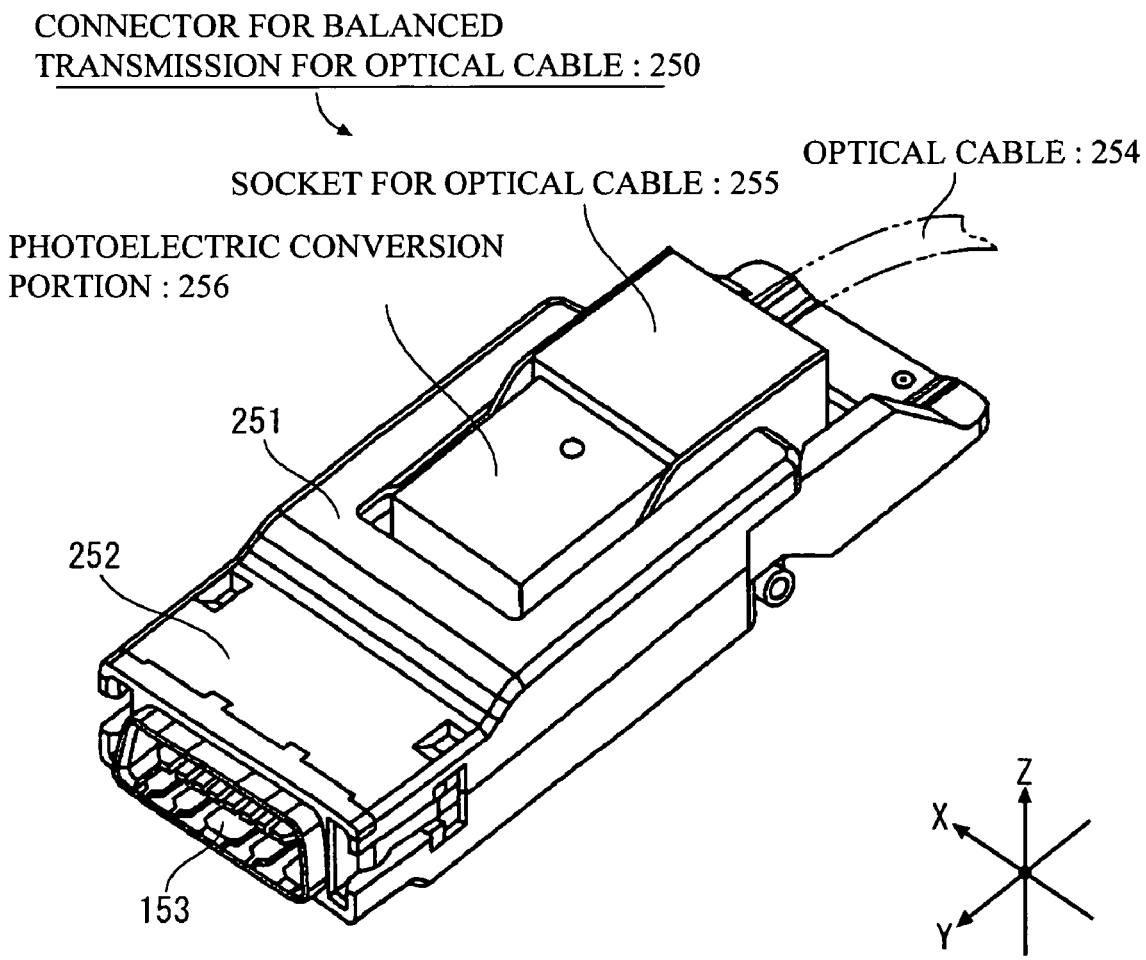
FIG. 13 illustrates a perspective view of a connector 250 for balanced transmission for optical cables in accordance with the second embodiment.

The detecting/power providing circuit 26 detects a type of cable (the electrical cable/the optical cable 154) coupled to the connector 103 for balanced transmission. That is, the detecting/power providing circuit 26 detects whether the type of cable is an electrical cable or an optical cable. However, it is not possible to couples an optical cable having a normal shape to the connector 103 for balanced transmission. Therefore, a connector 250 for balanced transmission for optical cables as shown in FIG. 13 is used in the embodiment.

The connector 250 for balanced transmission for optical cables has the plug (female) 153 for balanced transmission as same as the cable 150 for balanced transmission at one end of a connector body 252 for balanced transmission and has a socket 255 for optical cables to be inserted with an optical cable 254 at the other end of the connector body 252 for balanced transmission. A photoelectric conversion portion 256 having a photoelectric conversion element is mounted on the socket 255 for optical cables. Therefore, electrical signals are converted into optical lights, or optical signals are converted into electrical signals. The socket 255 for optical cables and the photoelectric conversion portion 256 are generally mounted on a board in the connector 250 for balanced transmission for optical cables. For this reason, a part of the socket 255 for optical cables and a part of the photoelectric conversion portion 256 are exposed outside of a housing 251 in order to miniaturize whole of the connector 250 for balanced transmission for optical cables.

Figure 14:
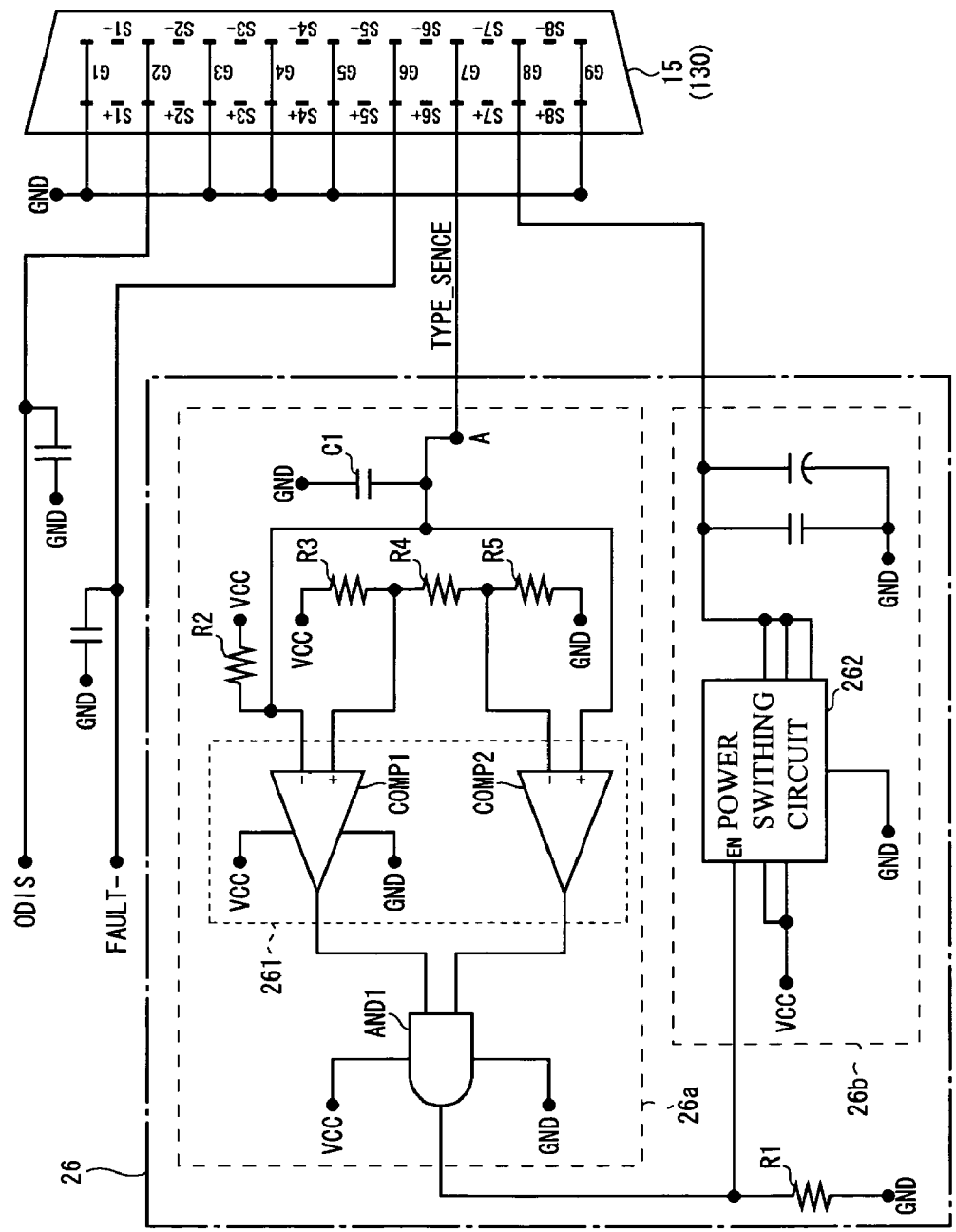
FIG. 14 illustrates a circuit configuration of a detecting/power providing circuit 26 in accordance with the second embodiment.

Next, a description will be given of a circuit configuration of the detecting/power providing circuit 26 with reference to FIG. 14. As shown in FIG. 14, the detecting/power providing circuit 26 has a detecting circuit 26a and a power providing circuit 26b.

The detecting circuit 26a has an AND circuit AND1, a deferential circuit 261 formed of comparators COMP1 and COMP2, resistors R2 through R5 and a condenser C1. The condenser C1 is provided for a purpose of filtering out radio frequency background.

The detecting circuit 26a is coupled to one of the ground terminals of the CX4 interface 15. As an example, a case where the detecting circuit 26a is coupled to the terminal G7 (Type_SENCE) is illustrated in the embodiment. When an electrical cable is coupled to the CX4 interface 15, that is to say, the cable 150 for balanced transmission as shown in FIG. 5 is coupled to the plug (male) 130 for balanced transmission, the terminal G7 is coupled to the ground GND in the cable 150 for balanced transmission. An electrical potential at a point A shown in FIG. 14 equals to Vcc X (Rc/(R2+Rc)), if sum total of a conductor resistance in the plug (male) 130 for balanced transmission and a conductor resistance in the cable 150 for balanced transmission before coupled to the ground GND equals to Rc. The electrical potential at the point A is approximately zero, because the sum total of the conductor resistances is too small compared to the resistance of the resistor R2.

The electrical potential at the point A is applied to an inverting input terminal (−) of the comparator COMP1 and a non-inverting input terminal (+) of the comparator COMP2. On the other hand, the reference voltage Vcc X ((R4+R5)/(R3+R4+R5)) (this value is referred to a reference voltage 1) is applied to the non-inverting input terminal (+) of the comparator COMP1. The reference voltage Vcc X (R5/(R3+R4+R5)) (this value is referred to a reference voltage 2) is applied to the inverting input terminal (−) of the comparator COMP2.

In the configuration mentioned above, an output of the comparator COMP1 is "high", because the electrical potential at the point A is smaller than the reference voltage 1. In contrast, an output of the comparator COMP2 is "Low", because the electrical potential at the point A is smaller than the reference voltage 2. The outputs of the comparator COMP1 and COMP2 are fed into the AND circuit AND1. An output of the AND circuit AND1 is "Low", because the outputs of the comparator COMP1 and COMP2 are respectively "High" and "Low". A power switching circuit 262 is thus off and electrical power is not provided to the terminal G8.

Next, a description will be given of a case where the connector 250 for balanced transmission is coupled. The terminal G7 is coupled to the ground GND through a resistor Ro in the connector 250 for balanced transmission for optical cables. The resistance of the resistor Ro is supposed to be compliant with following equation "R5/(R3+R4+R5)<Ro/(R2+Ro)<(R4+R5)/(R3+R4+R5)". In this case, the electrical potential of the point A is represented in a following equation "Vcc X (Ro/(R2+Ro))". The potential is lower than the reference voltage 1, and the output of the comparator COMP1 is "high". In addition, the electrical potential at the point A is higher than the reference voltage 2. And the output of the comparator COMP2 is "High". The output of the AND circuit AND1 is thus "High". As a result, the power switching circuit 262 is on and the electrical power is provided to the terminal G8.

Next, a description will be given of a case where no member is engaged with the plug (male) 130 for balanced transmission, that is to say, the terminal G7 is open. When the terminal G7 is open, the power voltage Vcc is applied to the point A through the resistor R2, and the electrical potential at the point A is nearly equal to the power voltage Vcc. In this case, the electrical potential at the point A is higher than the reference voltage 1, and the output of the comparator COMP1 is "Low". In contrast, the output of the comparator COMP2 is "High", because the electrical potential at the point A is higher than the reference voltage 2. The output of the AND circuit AND1 is thus "Low". As a result, the power switching circuit 262 is off, and the electrical power is not provided to the terminal G8. This is a process for safety purpose.

Here, a relationship among an input voltage of the TYPE_SCENE at the detecting/power providing circuit 26, the outputs of the comparator COMP1 and COMP2 and the AND circuit AND1, and conditions on or off of the power switching circuit 262 is presented in Table 1.

TABLE 1

| TYPE_SENCE INPUT VOLTAGE | | COMP1 | COMP2 | AND1 | CONDITION OF POWER |
|---|---|---|---|---|---|
| VOLTAGE RANGE | EXAMPLE | OUTPUT | OUTPUT | OUTPUT | SWITCHING CIRCUIT 262 |
| TYPE_SENCE < 0.8 V | 0 V | High | Low | Low | OFF |
| 0.8 V < TYPE_SENCE < 2.4 V | 1.6 V | High | High | High | ON |
| 2.4 V < TYPE_SENCE | 3.3 V | Low | High | Low | OFF |

As shown in Table 1, the power switching circuit 262 is on only when the input voltage of TYPE_SENCE is higher than the reference voltage 2 (for example, 0.8 V) and is lower than the reference voltage 2 (for example, 2.4 V).

In accordance with the embodiment, the transceiver module 100 is capable of detecting a type of cables coupled to the transceiver module 200 and is capable of operating based on the type.

THIRD EMBODIMENT

A detail description will be given of a third embodiment of the invention with reference to following drawings. Hereinafter, the same components and configurations as those of the first embodiment or the second embodiment have the same reference numerals and a detailed explanation will be omitted. In addition, unspecified configuration is same as in the first embodiment or the second embodiment.

Figure 15:
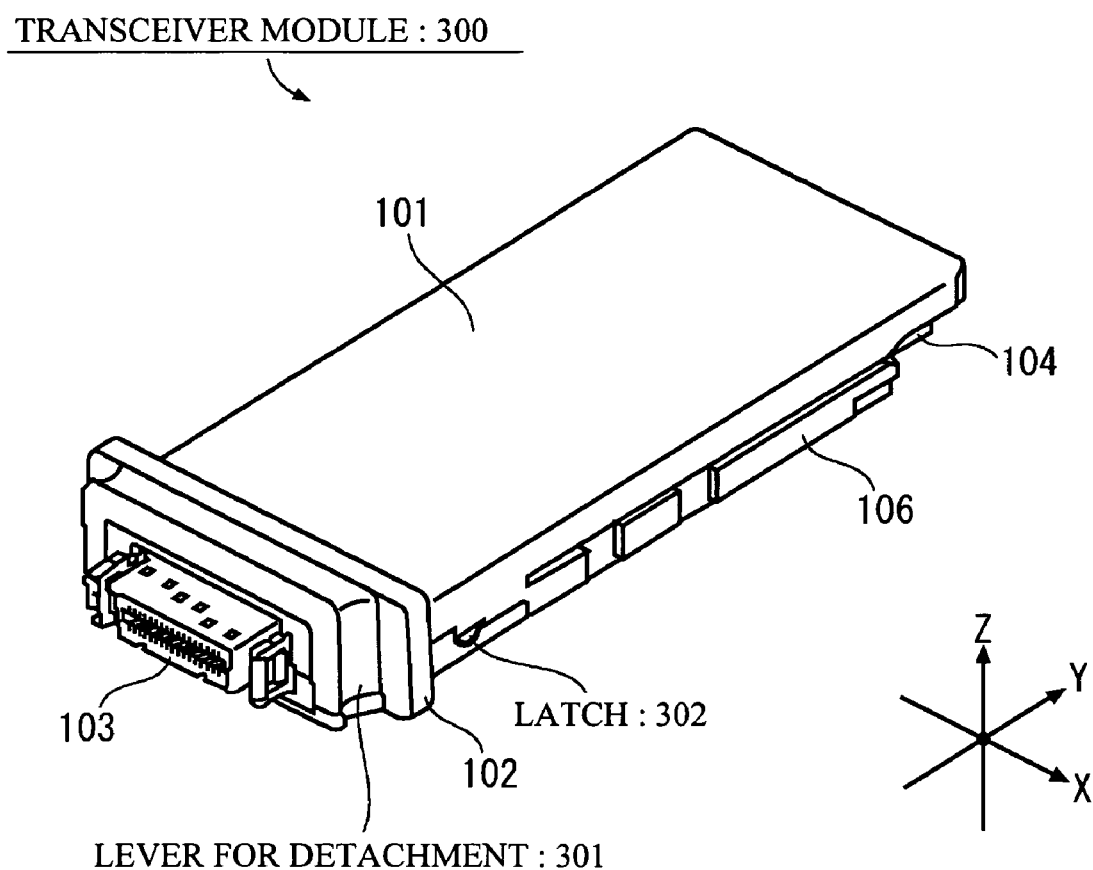
FIG. 15 illustrates a perspective view of a schematic exterior of a transceiver module 300 in accordance with a third embodiment (normal condition)

FIG. 15 illustrates a perspective view of a schematic exterior of a transceiver module 300 in accordance with the third embodiment. As shown in FIG. 15, the transceiver module 300 has the same structure as the transceiver module 100 in accordance with the first embodiment and has a lever for detachment 301 and a latch 302.

The latch 302 locks the transceiver module 300 at the host device, when the transceiver module 300 is attached to a slot of the host device and the latch 302 is engaged with a groove of the rail of the slot. The latch 302 prevents an unconsidered detachment of the transceiver module 300 from the host device. The lever for detachment 301 cancels the lock of the transceiver module 300 when the latch 302 is housed in the body of the transceiver module 300.

Figure 16:
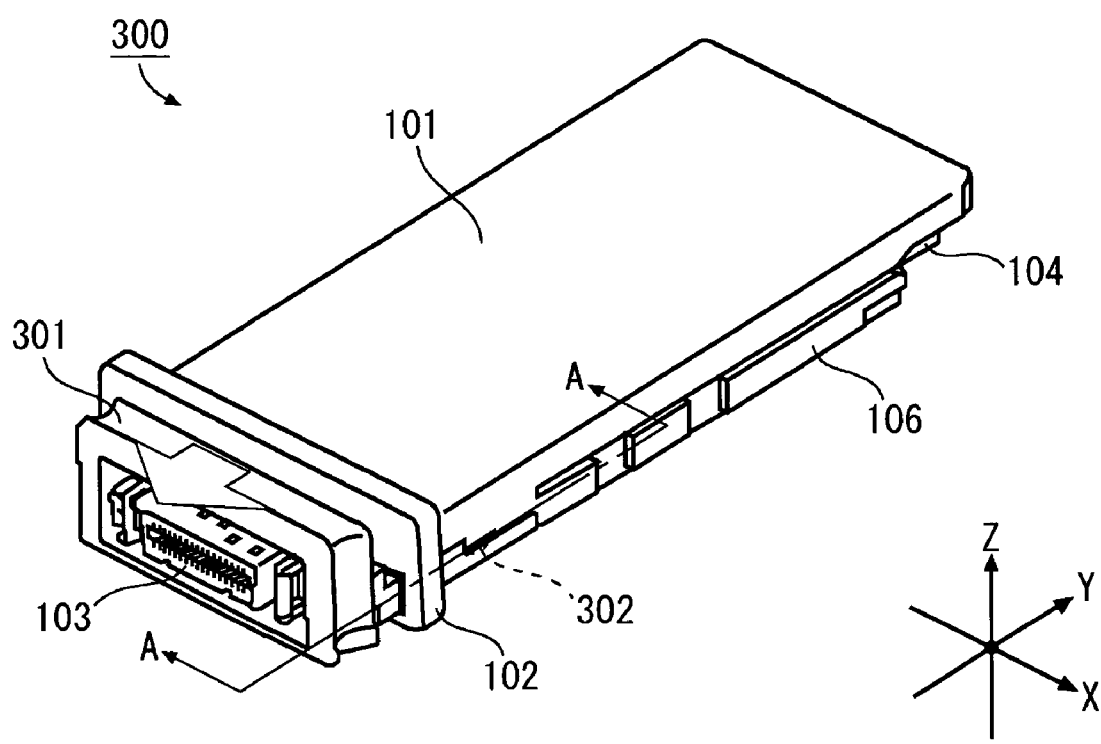
FIG. 16 illustrates a perspective view of a schematic exterior of the transceiver module 300 in accordance with the third embodiment (unlocking condition)

In the embodiment, the transceiver module 300 has a structure in which the latch 302 is housed in the transceiver module 300 when the lever for detachment 301 is pulled forward, that is to say, in a direction where the transceiver module 300 is pulled out from the host device. Hereinafter, a condition of the lever for detachment 301 shown in FIG. 15 is a locking condition or normal condition, and a condition of the lever for detachment 301 shown in FIG. 16 is unlocking condition.

Figure 17:
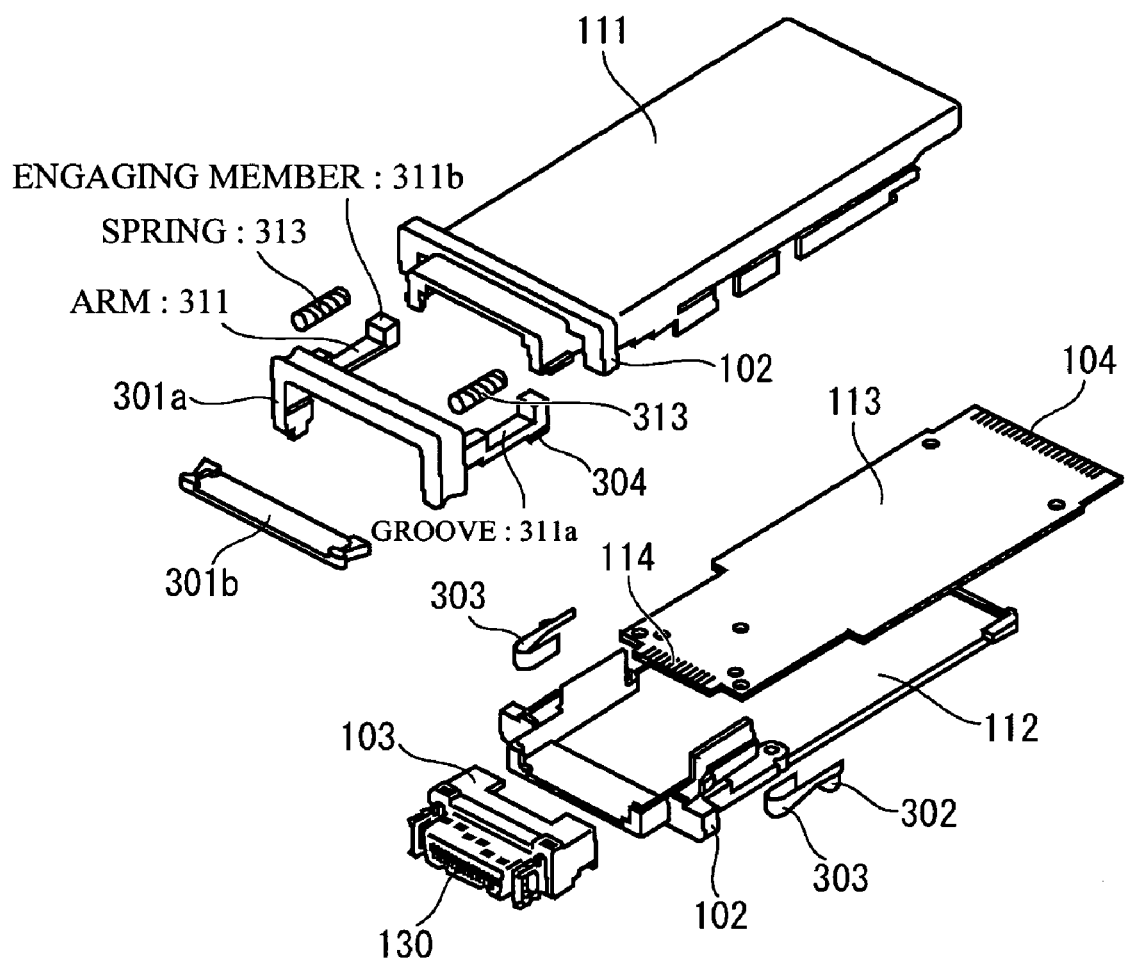
FIG. 17 illustrates an exploded view of the transceiver module 300 in accordance with the third embodiment.

FIG. 17 illustrates an exploded view of the transceiver module 300. As shown in FIG. 17, the transceiver module 300 has the same components as the transceiver module 100 in accordance with the first embodiment and lever members 301a and 301b forming the lever for detachment 301. That is, the lever for detachment 301 is formed of the lever members 301a and 301b. Beside those, the transceiver module 300 has a spring 313 and a metal member 303 having the latch 302.

There are provided arms 311 on the lever member 301a. The arm 311 has a groove 311a and engaging member 311b. The spring 313 is to be engaged with the groove 311a. The spring 313 is interpositioned between the engaging member 311b and the bezel 102 after assembled, and operates so that the lever for detachment 301 returns to normal condition. That is, the lever for detachment 301 is kept locked unless being pulled out.

In addition, there is provided a wedge 304 to be mentioned later at the tip of the arm 311. The wedge 304 slides being linked to the sliding of the lever for detachment 301.

The opposite side of the metal member 303 from the end part where the latch 302 is provided is formed U-shape. The part having U-shape serves as a spring.

Figure 18A:
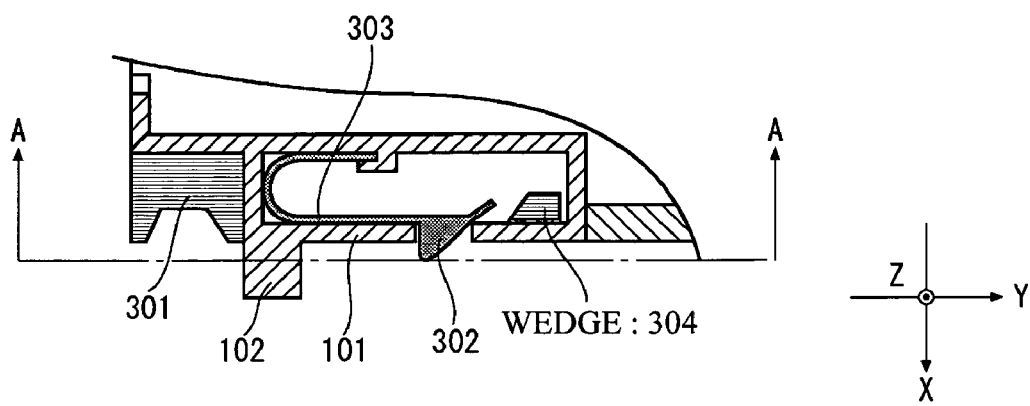
FIG. 18A and FIG. 18B illustrates an operation of a wedge 304 and a latch 302 in accordance with the third embodiment.
Figure 18B:
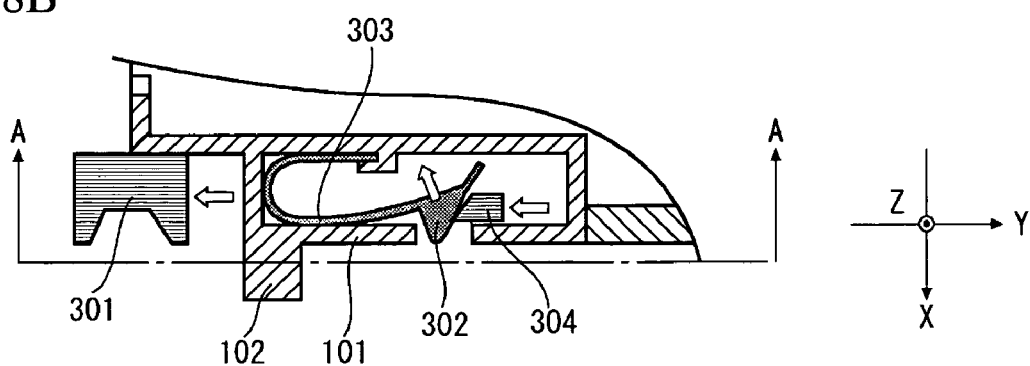

Next, a description will be given of the operation of the wedge 304 and the latch 302 with reference to FIG. 18A and FIG. 18B. FIG. 18A illustrates a cross sectional view of the transceiver module 300 being locked taken along a line A-A. FIG. 18B illustrates a cross sectional view of the transceiver module 300 being unlocked taken along a line A-A.

As shown in FIG. 18A, when the transceiver module 300 is locked, one end (the latch 302 side) of the metal member 303 is not burdened from the wedge 304. The latch 302 is thus projecting outside of the body of the transceiver module 300. On the other hand, when the lever for detachment 301 slides toward the minus Y-direction, the wedge 304 slides. The latch 302 side end of the metal member 303 is forced into the transceiver module 300. Therefore, the latch 302 is housed in the body of the transceiver module 300 (unlocked condition).

In accordance with the embodiment, it is possible to prevent the unconsidered detachment of the transceiver module from the host device.

FOURTH EMBODIMENT

Next, a description will be given of a fourth embodiment of the invention with reference to following drawings. Hereinafter, the same components and configurations as those of the first embodiment through the third embodiment have the same reference numerals and a detailed explanation will be omitted. In addition, unspecified configuration is the same as in one of the first embodiment through the third embodiment.

Heat is emitted from a chip component on the board provided in the transceiver module. For this reason, a transceiver module is generally formed by die-casting, because it is possible to form a blade (fin) in a chassis of a transceiver module. However, the chassis formed by die-casting is heavier and more expensive than a steel plate, and has a worse dimensional accuracy compared to a steel plate. The transceiver module using electrical signals shown in the embodiments mentioned above is superior to a conventional transceiver module using optical signals in electrical power consumption. In the embodiment, a pressed part is adopted to at least a part of the chassis of the transceiver module, for example, at least one of chassises forming a housing. Therefore, it is possible to provide a transceiver module whose size and weight is reduced and whose manufacturing accuracy and productivity rate is improved at a moderate cost.

In addition, a simple assembly mechanism is adopted in the embodiment in order to assemble the chassises of the transceiver module easily. In this case, the productivity rate is more improved.

Figure 19:
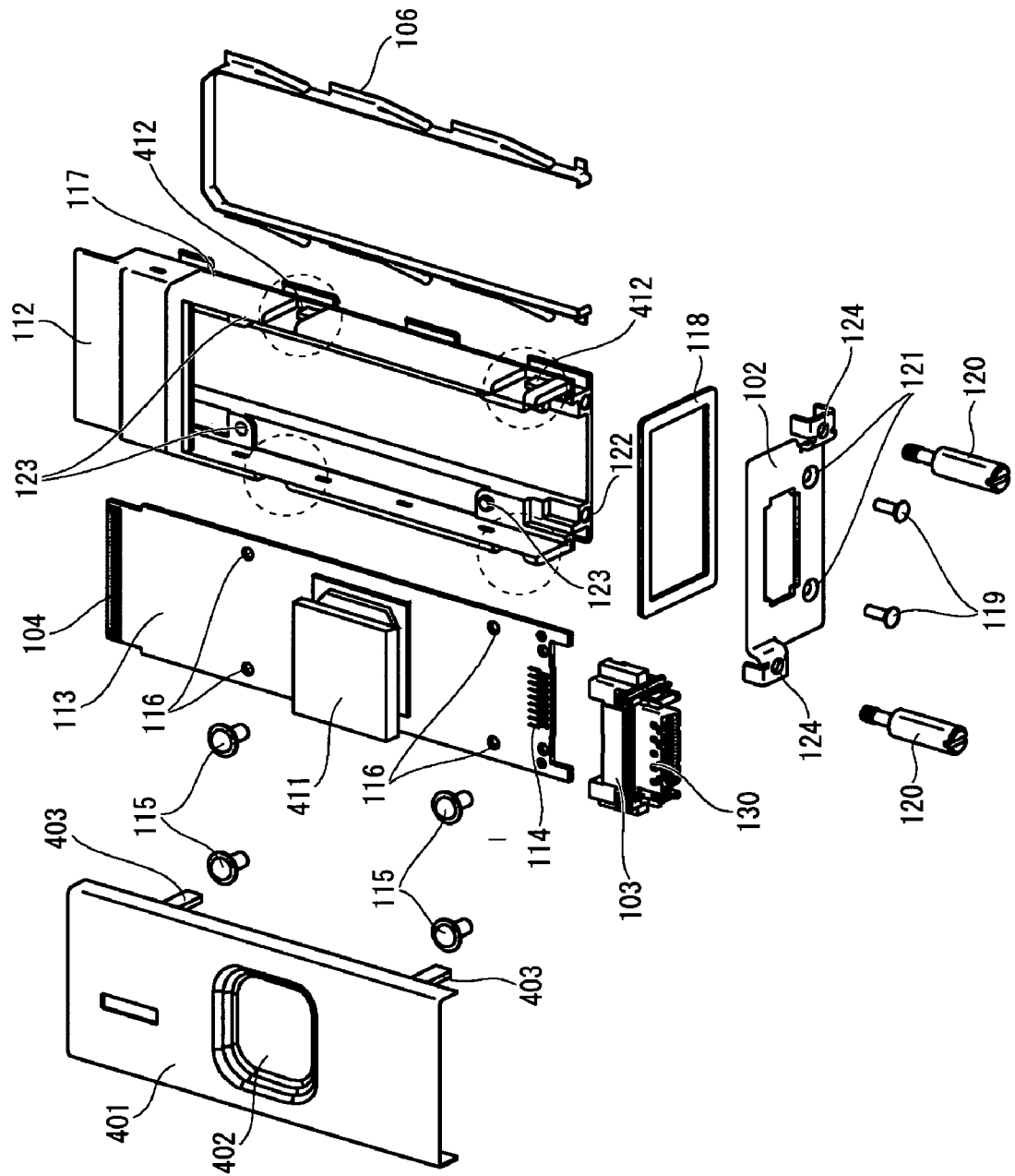
FIG. 19 illustrates an exploded view of a transceiver module 400 in accordance with a fourth embodiment.

FIG. 19 illustrates an exploded view of a transceiver module 400 in accordance with the fourth embodiment. As shown in FIG. 19, the transceiver module 400 has the same structure as the transceiver module in accordance with the first embodiment whose first chassis 111 is replaced to a first chassis 401. The first chassis 401 is a pressed steel plate. The first chassis 401 couples directly or indirectly to surface mounted components mounted on the PCB, in particular, a radiator 411. In addition, there is provided an air hole 402 to expose at least a part of the radiator 411 to outside of the transceiver module 400, in the first chassis 401. Further, there is provided a convexed locking mechanism 403 on the first chassis 401. When the locking mechanism 403 is engaged with a concaved locking mechanism 412 provided on the second chassis 112, the first chassis 401 is secured to the second chassis 112. The locking mechanism 403 serves as a spring. The spring is to be distorted when engaged with the locking mechanism 412.

In accordance with the embodiment, it is possible to provide a transceiver module that is assembled easily, whose size and weight is reduced, and whose manufacturing accuracy and productivity rate is improved at a moderate cost.

Although a description is given of the first chassis 401 and the second chassis 112 formed through pressing process that forms the housing of the transceiver module 400, the invention is not limited to the configuration mentioned above. The first chassis 401 or the second chassis 112 may be formed through molding process. However, it is preferable to metallize the chassis formed through the molding process in order to improve the chassis in electrical property.

FIFTH EMBODIMENT

Next, a detail description will be given of a fifth embodiment of the invention with reference to following drawings. Hereinafter, the same components and configurations as those of the first embodiment through the fourth embodiment have the same reference numerals and a detailed explanation will be omitted. In addition, unspecified configuration is same as in one of the first embodiment through the fourth embodiment.

In the connector 250 for balanced transmission for optical cables in accordance with the second embodiment, the photoelectric conversion portion 256 and the socket 255 for optical cables are mounted on the board provided in the housing 251, and the body of the connector 250 for optical cables for balanced transmission is configured to be thick. In the fifth embodiment, the photoelectric conversion portion 256 and the socket 255 for optical cables are provided at an end part of the board, and the thickness of the body is reduced.

Figure 20:
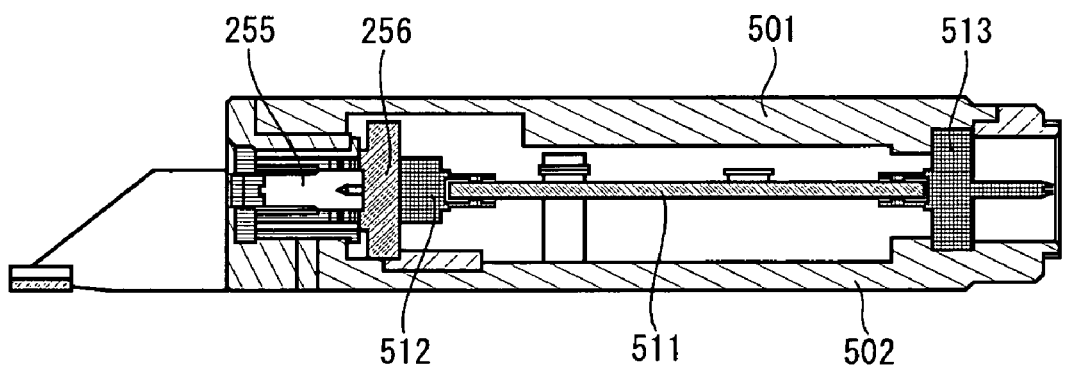
FIG. 20 illustrates a cross sectional view showing a structure of a connector 500 for balanced transmission for optical cables in accordance with a fifth embodiment.

FIG. 20 illustrates a cross sectional view showing the structure of a connector 500 for balanced transmission for optical cables in accordance with the fifth embodiment. In addition, FIG. 20 illustrates a cross sectional view in a case where the main surface of the connector 500 for balanced transmission for optical cables is a horizontal plane and the connector 500 for balanced transmission for optical cables is cut down in a direction vertical to the horizontal plane and along the length direction of the connector 500 for balanced transmission for optical cables.

As shown in FIG. 20, in the connector 500 for balanced transmission for optical cables, a board 511, the photoelectric conversion portion 256 and the socket 255 for optical cables are housed in the housing formed of a first chassis 501 and a second chassis 502. The photoelectric conversion portion 256 and the socket 255 for optical cables are assembled so that the acceptance and emission surface of the photoelectric conversion portion 256 is arranged on the bottom of the socket 255 for optical cables, as in the case of the embodiments mentioned above.

There is provided an internally coupled connector 512 to be inserted with the board 511 on the rear face of the photoelectric conversion portion 256, that is to say, the opposite side face from the face where the socket 255 for optical cables is provided. That is, one end part of the board 511 has a connector shape of card edge type. The end part is inserted in the internally coupled connector 512 provided on the rear face of the photoelectric conversion portion 256. In addition, the board 511 is configured so that a characteristic impedance of signal lines is 100 ohm at differential signals.

In addition, the opposite end part of the board 511 from the end part where the photoelectric conversion portion 256 is provided has a connector shape of what is called card edge type. The end part is configured to be inserted in a plug member (convexed member) 513 formed integrally with the internally coupled connector. The plug member (convexed member) 513 is also called an external coupled connector. A detail description will be given of the configuration.

As shown in FIG. 11, a signal contact having an insulator therebetween is arranged vertically at the external coupled connector side of the plug member (convexed member) 513, and has a shape where the ground contact is provided at both sides in a horizontal direction through the insulator. On the other hand, the internally coupled connector side of the plug member has a shape of right angle SMT (Surface Mount Technology) type, and has a shape of clipping type of SMT.

As is configured above, it is possible to arrange the socket 255 for optical cables, the photoelectric conversion portion 256, the board 511 and the plug member (convexed member) 513 on display, and is possible to reduce the thickness of the connector 500 for balanced transmission for optical cables.

Figure 21:
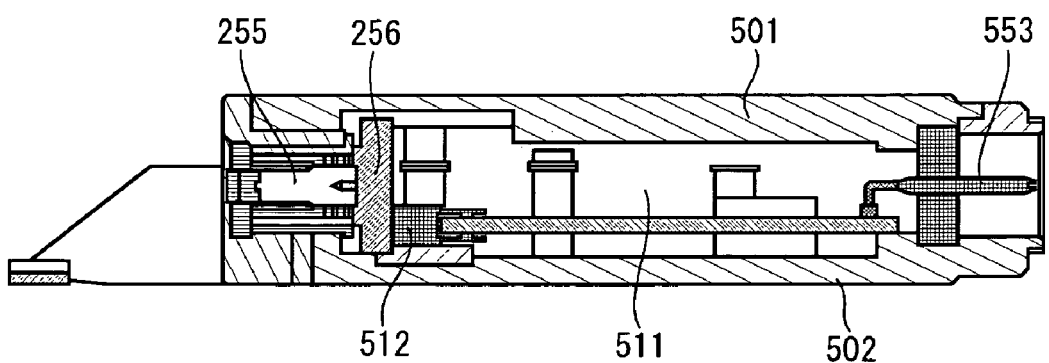
FIG. 21 illustrates a structure of a connector 550 for balanced transmission for optical cables in accordance with the fifth embodiment.

FIG. 21 illustrates a structure of a connector 550 for balanced transmission for optical cables. As shown in FIG. 21, the connector 550 for balanced transmission for optical cables has the same structure as the connector 500 for balanced transmission for optical cables shown in FIG. 20. The internally coupled connector 512 is provided not at the center but at a lower side (lower side in FIG. 20) from the center on the rear face of the photoelectric conversion portion 256. In this structure, the board 511 is coupled electrically to the plug (male) member 553 through a metal member formed L-shape.

It is possible to couple the board 511 and the plug (male) member 553 through a flexible board or the like. However, in this case, a transmission path gets longer by a limitation of bending radius of the flexible board, and it is possible that loss of transmission is increased. In addition, a room for the bending radius of the flexible board is necessary, and it is possible that the device is increased in size. Further, there is a case where signal characteristic is affected by refraction caused by bending of the flexible board. Therefore, it is preferable that the board 511 is coupled electrically to the plug (male) member 553 through the metal member formed L-shape.

In addition, it is preferable that the first chassis 501 and the second chassis 502 housing the photoelectric conversion portion 256 and the board 511 are formed of metal. In this case, it is possible to eliminate exogenous noise and to improve electrical characteristic.

SIXTH EMBODIMENT

Next, a description will be given of a sixth embodiment of the invention with reference to following drawings. Hereinafter, the same components and configurations as those of the first embodiment through the fifth embodiment have the same reference numerals and a detailed explanation will be omitted. In addition, unspecified configuration is same as in one of the first embodiment through the fifth embodiment.

In the sixth embodiment, a description will be given of a structure that fixes the transceiver module and the connector for balanced transmission for optical cables (including a connector for balanced transmission) as shown in the embodiments mentioned above.

Figure 22A:
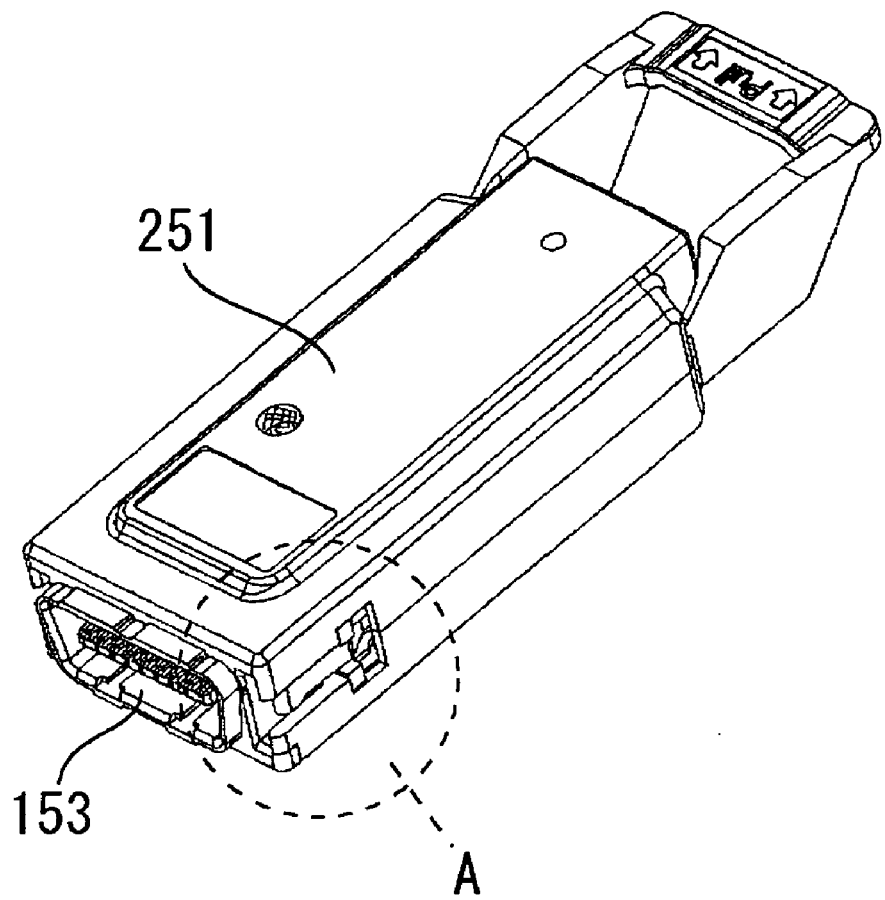
FIG. 22A and FIG. 22B illustrate a perspective view of a connector for balanced transmission in accordance with a sixth embodiment.
Figure 22B:
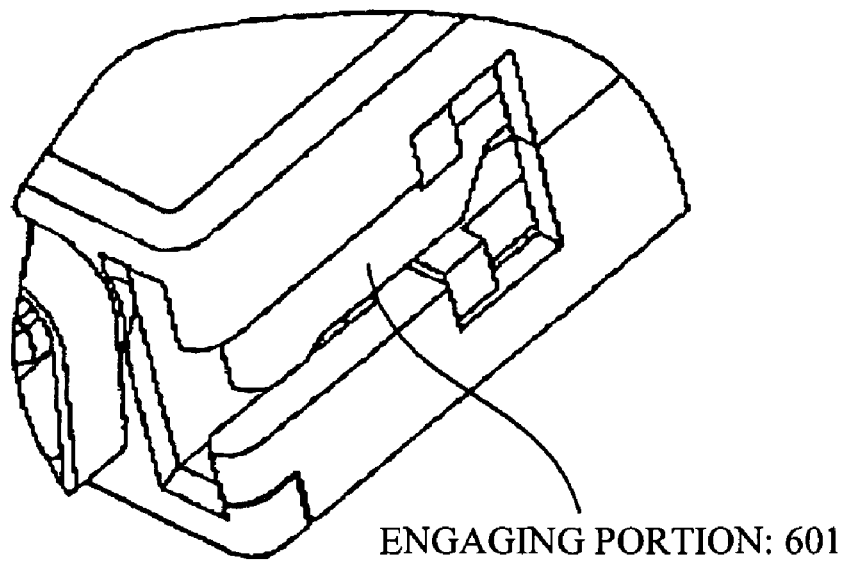

FIG. 22A and FIG. 22B illustrate a structure in accordance with the sixth embodiment. FIG. 22B illustrates an enlarged view of an area A shown in FIG. 22A. As shown in FIG. 22A and FIG. 22B, at both sides of the part of the connector for balanced transmission for optical cables where the plug (female) 153 for balanced transmission is provided, there is provided a concaved engaging portion 601 to be engaged with an engaging portion that is provided in the transceiver module and has a hook shape. It is thus possible to fix the both and is possible to prevent an unconsidered detachment of the both.

Figure 23:
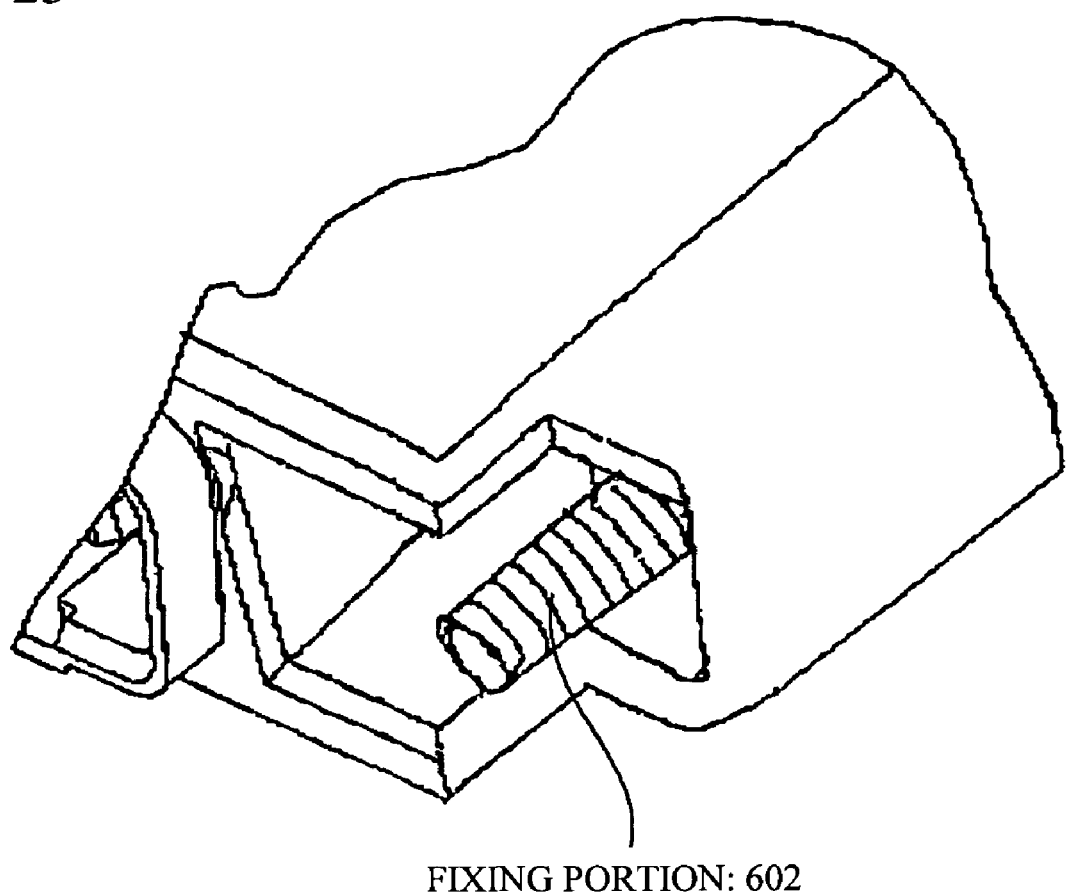
FIG. 23 illustrates a perspective view of another connector for balanced transmission.

In addition, the structure mentioned above may be a screw type of fixing portion 602, as is shown in FIG. 23.

The first embodiment through the sixth embodiment are only examples. The invention is not limited to those embodiments. In addition, it will be appreciated that the invention is susceptible of modification, variation and change without departing from the proper and fair meaning of the accompanying claims.

The invention claimed is:

1. A transceiver module, comprising:
    an electrical connector for balanced transmission to receive and transmit data as electrical signals having a first electrical signal format for balanced transmission via an electrical cable for the balanced transmission removably attached to the electrical connector;
    a card edge connector that is removably attached to a motherboard of an information-processing device to transmit and receive data as electrical signals having a second electrical signal format to and from the motherboard of the information-processing device; and
    a transceiver portion that converts data from/to the first electrical signal format and to/from the second electrical signal format, and transmits the data in the first electrical signal format to and receives the data in the second electrical signal format from other components coupled to the electrical connector via the electrical cable, and receives the data from transmits the data to in the second electrical signal format to the information-processing device.

2. The transceiver module as claimed in claim 1, wherein the transceiver portion is coupled to the information-processing device through a 10 Gigabit Attachment Unit Interface compliant with IEEE802.3ae and is coupled to the other components through a CX4 interface compliant with IEEE802.3z 10GBASE-CX4.

3. The transceiver module as claimed in claim 1 further comprising a control portion that controls the transceiver portion,
    wherein the control portion controls the transceiver portion according to a control signal that is input from the information-processing device through the card edge connector.

4. The transceiver module as claimed in claim 1 further comprising a power portion that provides electrical power to at least the transceiver portion,
    wherein the power portion provides the electrical power according to a power supply voltage applied from the information-processing device through the card edge connector.

5. The transceiver module as claimed in claim 1 further comprising a reference clock generating portion that generates a reference clock, wherein:
    the transceiver portion detects a clock from a signal that is input from the electrical connector for balanced transmission; and
    the transceiver portion adjusts an edge timing between a bit range that is input from the information-processing device and the reference clock that is input from the reference clock generating portion, synchronizes with the other components, and transmits the data.

6. The transceiver module of claim 1, wherein the electrical connector for balanced transmission is optically connectable to an optical cable for balanced transmission via a photoelectric conversion portion, and the transceiver module further comprises:
    a detecting portion that detects whether a cable coupled to the connector for balanced transmission is the electrical cable; and
    a power providing portion that provides an electrical power to the electrical cable if the cable is the electrical cable.

7. The transceiver module as claimed in claim 6, wherein the detecting portion detects whether the cable is the electrical cable according to an electrical potential at the ground terminals.

8. The transceiver module as claimed in claim 6, wherein the power providing portion provides an electrical power to the electrical cable through one of the ground terminals.

* * * * *

UNITED STATES PATENT AND TRADEMARK OFFICE
CERTIFICATE OF CORRECTION

| | |
|---|---|
| PATENT NO. | : 7,549,805 B2 |
| APPLICATION NO. | : 11/635545 |
| DATED | : June 23, 2009 |
| INVENTOR(S) | : Shigeyuki Takizawa et al. |

It is certified that error appears in the above-identified patent and that said Letters Patent is hereby corrected as shown below:

Column 18, Line 2, change "second" to --first--.

Column 18, Lines 4-5, change "and receives the data from transmits the data to in the second" to --and receives the data in the second electrical signal format from and transmits the data in the second--.

Signed and Sealed this

Twenty-seventh Day of October, 2009

David J. Kappos
*Director of the United States Patent and Trademark Office*